United States Patent
Bisaiji et al.

(10) Patent No.: US 9,623,375 B2
(45) Date of Patent: Apr. 18, 2017

(54) EXHAUST PURIFICATION SYSTEM OF INTERNAL COMBUSTION ENGINE

(71) Applicants: Yuki Bisaiji, Mishima (JP); Kohei Yoshida, Gotemba (JP); Mikio Inoue, Susono (JP)

(72) Inventors: Yuki Bisaiji, Mishima (JP); Kohei Yoshida, Gotemba (JP); Mikio Inoue, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 676 days.

(21) Appl. No.: 14/108,113

(22) Filed: Dec. 16, 2013

(65) Prior Publication Data
US 2014/0105799 A1    Apr. 17, 2014

Related U.S. Application Data

(62) Division of application No. 13/202,694, filed as application No. PCT/JP2010/054730 on Mar. 15, 2010, now Pat. No. 8,671,667.

(51) Int. Cl.
  *F01N 3/00* (2006.01)
  *F01N 3/10* (2006.01)
  (Continued)

(52) U.S. Cl.
  CPC ....... *B01D 53/9431* (2013.01); *F01N 3/0814* (2013.01); *F01N 3/0842* (2013.01); *F01N 3/0871* (2013.01); *F01N 3/2033* (2013.01); *F02D 41/0275* (2013.01); *F02D 41/1446* (2013.01); *F01N 2240/30* (2013.01); *F01N 2560/026* (2013.01); *F02D 41/405* (2013.01); *Y02T 10/26* (2013.01)

(58) Field of Classification Search
  USPC .......................... 60/274, 276, 285, 299, 301
  See application file for complete search history.

(56) References Cited

U.S. PATENT DOCUMENTS

| 5,052,178 A | 10/1991 | Clerc et al. |
| 5,057,483 A | 10/1991 | Wan |

(Continued)

FOREIGN PATENT DOCUMENTS

| CN | 101454081 A | 6/2009 |
| CN | 101600860 A | 12/2009 |

(Continued)

OTHER PUBLICATIONS

Corrected Notice of Allowability dated Feb. 6, 2014 issued in U.S. Appl. No. 13/202,694.

(Continued)

*Primary Examiner* — Thomas Denion
*Assistant Examiner* — Diem Tran
(74) *Attorney, Agent, or Firm* — Oliff PLC

(57) ABSTRACT

A method for purifying exhaust gas of an internal combustion engine, including chemically reducing NOx that is contained in the exhaust gas when a concentration of hydrocarbons flowing into an exhaust purification catalyst is made to vibrate within a predetermined range of amplitude and within a predetermined range of period, wherein, during the chemical reduction, the NOx contained in the exhaust gas is reacted with reformed hydrocarbons to produce a reducing intermediate containing nitrogen and hydrocarbons, a reducing action of the reducing intermediate chemically reduces the NOx, and the NOx is chemically reduced without storing nitrates or with storing a fine amount of the nitrates in a basic layer of the exhaust purification catalyst.

25 Claims, 26 Drawing Sheets

(51) Int. Cl.
  *B01D 53/94* (2006.01)
  *F01N 3/20* (2006.01)
  *F02D 41/02* (2006.01)
  *F02D 41/14* (2006.01)
  *F01N 3/08* (2006.01)
  *F02D 41/40* (2006.01)

(56) References Cited

U.S. PATENT DOCUMENTS

| | | | |
|---|---|---|---|
| 5,075,274 A | 12/1991 | Kiyohide et al. | |
| 5,402,641 A | 4/1995 | Katoh et al. | |
| 5,882,607 A | 3/1999 | Miyadera et al. | |
| 6,109,024 A | 8/2000 | Kinugasa et al. | |
| 6,176,079 B1 * | 1/2001 | Konrad | F01N 3/0814 423/234 |
| 6,327,851 B1 | 12/2001 | Bouchez et al. | |
| 6,413,483 B1 | 7/2002 | Brisley et al. | |
| 6,477,834 B1 | 11/2002 | Asanuma et al. | |
| 6,667,018 B2 | 12/2003 | Noda et al. | |
| 6,725,647 B2 * | 4/2004 | Pfeifer | B01D 53/9477 422/171 |
| 6,766,642 B2 * | 7/2004 | Binder | B01D 53/9418 60/274 |
| 6,813,882 B2 | 11/2004 | Hepburn et al. | |
| 6,820,415 B2 * | 11/2004 | Abet | B01D 53/90 123/299 |
| 6,854,264 B2 | 2/2005 | Elwart et al. | |
| 6,877,311 B2 | 4/2005 | Uchida | |
| 6,983,589 B2 | 1/2006 | Lewis et al. | |
| 7,063,642 B1 | 6/2006 | Hu et al. | |
| 7,073,325 B2 | 7/2006 | Nakatani et al. | |
| 7,082,753 B2 | 8/2006 | Dalla Betta et al. | |
| 7,111,456 B2 | 9/2006 | Yoshida et al. | |
| 7,137,379 B2 | 11/2006 | Sasaki et al. | |
| 7,146,800 B2 | 12/2006 | Toshioka et al. | |
| 7,165,393 B2 | 1/2007 | Betta et al. | |
| 7,299,625 B2 | 11/2007 | Uchida et al. | |
| 7,332,135 B2 | 2/2008 | Gandhi et al. | |
| 7,412,823 B2 | 8/2008 | Reuter et al. | |
| 7,454,900 B2 | 11/2008 | Hayashi | |
| 7,484,504 B2 | 2/2009 | Kato et al. | |
| 7,506,502 B2 | 3/2009 | Nakano et al. | |
| 7,549,284 B2 | 6/2009 | Iihoshi et al. | |
| 7,703,275 B2 | 4/2010 | Asanuma et al. | |
| 7,707,821 B1 | 5/2010 | Legare | |
| 7,861,516 B2 | 1/2011 | Allansson et al. | |
| 8,099,950 B2 | 1/2012 | Kojima et al. | |
| 8,215,101 B2 | 7/2012 | Tsujimoto et al. | |
| 8,261,532 B2 | 9/2012 | Fukuda et al. | |
| 8,281,569 B2 | 10/2012 | Handa et al. | |
| 8,434,296 B2 | 5/2013 | Wada et al. | |
| 8,572,950 B2 | 11/2013 | Bisaiji et al. | |
| 8,656,706 B2 | 2/2014 | Umemoto et al. | |
| 8,671,667 B2 | 3/2014 | Bisaiji et al. | |
| 8,679,410 B2 | 3/2014 | Umemoto et al. | |
| 8,689,543 B2 | 4/2014 | Numata et al. | |
| 8,695,325 B2 | 4/2014 | Bisaiji et al. | |
| 2001/0052232 A1 | 12/2001 | Hoffmann et al. | |
| 2002/0029564 A1 | 3/2002 | Roth et al. | |
| 2002/0053202 A1 | 5/2002 | Akama et al. | |
| 2003/0010020 A1 | 1/2003 | Taga et al. | |
| 2003/0040432 A1 | 2/2003 | Beall et al. | |
| 2003/0101713 A1 | 6/2003 | Dalla Betta et al. | |
| 2004/0045285 A1 | 3/2004 | Penetrante et al. | |
| 2004/0050037 A1 | 3/2004 | Betta et al. | |
| 2004/0055285 A1 | 3/2004 | Rohr et al. | |
| 2004/0154288 A1 | 8/2004 | Okada et al. | |
| 2004/0175305 A1 | 9/2004 | Nakanishi et al. | |
| 2004/0187477 A1 | 9/2004 | Okugawa et al. | |
| 2005/0135977 A1 | 6/2005 | Park et al. | |
| 2005/0147541 A1 | 7/2005 | Ajisaka et al. | |
| 2006/0053778 A1 | 3/2006 | Asanuma et al. | |
| 2006/0107657 A1 | 5/2006 | Bernler et al. | |
| 2006/0153761 A1 | 7/2006 | Bandl-Konrad et al. | |
| 2006/0286012 A1 | 12/2006 | Socha et al. | |
| 2007/0016357 A1 | 1/2007 | Nakagawa et al. | |
| 2007/0028601 A1 | 2/2007 | Duvinage et al. | |
| 2007/0059223 A1 | 3/2007 | Golunski et al. | |
| 2007/0089403 A1 | 4/2007 | Pfeifer et al. | |
| 2007/0125073 A1 | 6/2007 | Reuter et al. | |
| 2007/0151232 A1 | 7/2007 | Dalla Betta et al. | |
| 2008/0022662 A1 | 1/2008 | Yan | |
| 2008/0053073 A1 | 3/2008 | Kalyanaraman et al. | |
| 2008/0102010 A1 | 5/2008 | Bruck et al. | |
| 2008/0120963 A1 | 5/2008 | Morita et al. | |
| 2008/0148711 A1 | 6/2008 | Takubo | |
| 2008/0154476 A1 | 6/2008 | Takubo | |
| 2008/0196398 A1 | 8/2008 | Yan | |
| 2008/0223020 A1 | 9/2008 | Yoshida et al. | |
| 2008/0276602 A1 | 11/2008 | McCabe et al. | |
| 2009/0000277 A1 | 1/2009 | Yoshida et al. | |
| 2009/0049824 A1 | 2/2009 | Kojima et al. | |
| 2009/0049825 A1 | 2/2009 | Ohashi | |
| 2009/0049826 A1 | 2/2009 | Toshioka et al. | |
| 2009/0077948 A1 | 3/2009 | Mondori et al. | |
| 2009/0084091 A1 | 4/2009 | Tsujimoto et al. | |
| 2009/0118121 A1 | 5/2009 | Sarai | |
| 2009/0120072 A1 | 5/2009 | Dalla Betta et al. | |
| 2009/0151332 A1 | 6/2009 | Toshioka et al. | |
| 2009/0191108 A1 | 7/2009 | Blanchard et al. | |
| 2009/0196811 A1 | 8/2009 | Yamashita et al. | |
| 2009/0229251 A1 | 9/2009 | Kadowaki | |
| 2009/0249768 A1 | 10/2009 | Asanuma et al. | |
| 2009/0266057 A1 | 10/2009 | Tsujimoto et al. | |
| 2009/0282809 A1 | 11/2009 | Toshioka | |
| 2009/0288393 A1 | 11/2009 | Matsuno et al. | |
| 2009/0313970 A1 | 12/2009 | Iida | |
| 2010/0005873 A1 | 1/2010 | Katoh et al. | |
| 2010/0055012 A1 | 3/2010 | Grisstede et al. | |
| 2010/0107613 A1 | 5/2010 | Masuda et al. | |
| 2010/0115923 A1 | 5/2010 | Tsujimoto et al. | |
| 2010/0126148 A1 | 5/2010 | Morishima et al. | |
| 2010/0132356 A1 | 6/2010 | Lee | |
| 2010/0154387 A1 | 6/2010 | Shibata et al. | |
| 2010/0233051 A1 | 9/2010 | Grisstede et al. | |
| 2010/0236224 A1 | 9/2010 | Kumar et al. | |
| 2010/0242459 A1 | 9/2010 | Tsujimoto et al. | |
| 2011/0041486 A1 | 2/2011 | Kato et al. | |
| 2011/0047984 A1 | 3/2011 | Lee et al. | |
| 2011/0047988 A1 | 3/2011 | Lewis et al. | |
| 2011/0113754 A1 | 5/2011 | Kohara et al. | |
| 2011/0120100 A1 | 5/2011 | Yin et al. | |
| 2011/0131952 A1 | 6/2011 | Onodera et al. | |
| 2011/0173950 A1 | 7/2011 | Wan et al. | |
| 2011/0209459 A1 | 9/2011 | Hancu et al. | |
| 2012/0122660 A1 | 5/2012 | Andersen et al. | |
| 2012/0124967 A1 | 5/2012 | Yang et al. | |
| 2012/0124971 A1 | 5/2012 | Bisaiji et al. | |
| 2012/0131908 A1 | 5/2012 | Bisaiji et al. | |
| 2013/0000284 A1 | 1/2013 | Bisaiji et al. | |
| 2013/0011302 A1 | 1/2013 | Bisaiji et al. | |
| 2013/0022512 A1 | 1/2013 | Bisaiji et al. | |

FOREIGN PATENT DOCUMENTS

| | | | |
|---|---|---|---|
| EP | 1 033 479 A2 | 9/2000 | |
| EP | 1 273 337 A1 | 1/2003 | |
| EP | 1 371 415 A1 | 12/2003 | |
| EP | 1 519 015 A2 | 3/2005 | |
| EP | 1544429 A1 | 6/2005 | |
| EP | 1 710 407 A1 | 10/2006 | |
| EP | 1 793 099 A1 | 6/2007 | |
| EP | 1 911 506 A1 | 4/2008 | |
| EP | 1 936 164 A1 | 6/2008 | |
| EP | 1 965 048 A1 | 9/2008 | |
| EP | 2 063 078 A1 | 5/2009 | |
| EP | 2 149 684 A1 | 2/2010 | |
| EP | 2 239 432 | 10/2010 | |
| EP | 2 460 989 A1 | 6/2012 | |
| JP | A-04-200637 | 7/1992 | |
| JP | H-08-117601 | 5/1996 | |
| JP | A-09-004437 | 1/1997 | |
| JP | A-09-220440 | 8/1997 | |

(56) References Cited

FOREIGN PATENT DOCUMENTS

| | | |
|---|---|---|
| JP | A-11-30117 | 2/1999 |
| JP | A-11-062559 | 3/1999 |
| JP | A-11-081994 | 3/1999 |
| JP | A-2000-257419 | 9/2000 |
| JP | A-2002-188429 | 7/2002 |
| JP | A-2004-016850 | 1/2004 |
| JP | A-2004-36543 | 2/2004 |
| JP | A-2004-216224 | 8/2004 |
| JP | A-2004-290965 | 10/2004 |
| JP | A-2004-308526 | 11/2004 |
| JP | A-2004-316458 | 11/2004 |
| JP | A-2005-61340 | 3/2005 |
| JP | A-2005-113801 | 4/2005 |
| JP | A-2005-171853 | 6/2005 |
| JP | A-2005-177738 | 7/2005 |
| JP | A-2006-501390 | 1/2006 |
| JP | A-2006-512529 | 4/2006 |
| JP | A-2006-342700 | 12/2006 |
| JP | A-2007-064167 | 3/2007 |
| JP | A-2007-514090 | 5/2007 |
| JP | A-2007-514104 | 5/2007 |
| JP | A-2007-154794 | 6/2007 |
| JP | B2-3969450 | 6/2007 |
| JP | A-2007-278120 | 10/2007 |
| JP | A-2008-002451 | 1/2008 |
| JP | A-2008-19760 | 1/2008 |
| JP | A-2008-69769 | 3/2008 |
| JP | A-2008-231926 | 10/2008 |
| JP | A-2008-232003 | 10/2008 |
| JP | A-2008-255858 | 10/2008 |
| JP | A-2008-267178 | 11/2008 |
| JP | A-2008-267217 | 11/2008 |
| JP | A-2008-286186 | 11/2008 |
| JP | A-2008-543559 | 12/2008 |
| JP | A-2009-30560 | 2/2009 |
| JP | A-2009-112967 | 5/2009 |
| JP | A-2009-114879 | 5/2009 |
| JP | A-2009-156067 | 7/2009 |
| JP | A-2009-165922 | 7/2009 |
| JP | A-2009-167973 | 7/2009 |
| JP | A-2009-168031 | 7/2009 |
| JP | A-2009-191823 | 8/2009 |
| JP | A-2009-221939 | 10/2009 |
| JP | A-2009-226349 | 10/2009 |
| JP | A-2009-243362 | 10/2009 |
| JP | A-2009-275631 | 11/2009 |
| JP | A-2009-275666 | 11/2009 |
| JP | A-2010-012459 | 1/2010 |
| JP | A-2010-048134 | 3/2010 |
| JP | 2011-190803 | 9/2011 |
| JP | B1-4868097 | 2/2012 |
| WO | WO 2005/059324 | 6/2005 |
| WO | WO 2006/131825 | 12/2006 |
| WO | WO 2007/026229 | 3/2007 |
| WO | WO 2007/141638 | 12/2007 |
| WO | WO 2008/007810 | 1/2008 |
| WO | WO 2008/012653 A2 | 1/2008 |
| WO | WO 2009/016822 | 2/2009 |
| WO | WO 2009/056958 | 5/2009 |
| WO | WO 2009/082035 A1 | 7/2009 |
| WO | WO 2011/114499 | 9/2011 |
| WO | WO 2011/114501 | 9/2011 |
| WO | WO 2011/118044 | 9/2011 |

OTHER PUBLICATIONS

Aug. 13, 2013 International Preliminary Report on Patentability issued in International Patent Application No. PCT/JP2011/053429 (with translation).
Aug. 8, 2013 Office Action issued in U.S. Appl. No. 13/258,483.
Dec. 21, 2010 International Search Report issued in International Patent Application No. PCT/JP2010/065449 (with translation).
Dec. 27, 2011 International Search Report issued in International Patent Application No. PCT/JP2011/075618 (with translation).
Jan. 18, 2011 International Search Report issued in International Patent Application No. PCT/JP2010/067705.
Jan. 18, 2011 International Search Report issued in International Patent Application No. PCT/JP2010/067707.
Jan. 18, 2011 International Search Report issued in International Patent Application No. PCT/JP2010/068785.
Jul. 14, 2014 Office Action issued in U.S. Appl. No. 13/262,001.
Jul. 14, 2014 Office Action issued in U.S. Appl. No. 13/264,884.
Jun. 16, 2014 Office Action issued in U.S. Appl. No. 13/581,186.
Jun. 18, 2014 Office Action issued in U.S. Appl. No. 13/582,909.
Jun. 19, 2014 Office Action issued in U.S. Appl. No. 13/264,594.
Jun. 21, 2011 International Search Report issued in International Patent Application No. PCT/JP2011/059880 (with translation).
Jun. 23, 2014 Office Action issued in U.S. Appl. No. 13/262,858.
Jun. 26, 2014 Office Action issued in U.S. Appl. No. 13/580,000.
Jun. 29, 2010 International Search Report issued in International Patent Application No. PCT/JP2010/055303 (with translation).
Mar. 22, 2011 International Search Report issued in International Patent Application No. PCT/JP2010/073645 (with translation).
Mar. 22, 2011 International Search Report issued in International Patent Application No. PCT/JP2010/072299 (with translation).
Mar. 8, 2011 International Search Report issued in International Patent Application No. PCT/JP2011/052969 (with translation).
May 17, 2011 International Search Report issued in International Patent Application No. PCT/JP2011/057264 (with translation).
May 2, 2014 Office Action issued in U.S. Appl. No. 13/263,660.
Mar. 28, 2014 Notice of Allowance issued in U.S. Appl. No. 13/582,862.
Mar. 4, 2014 Notice of Allowance issued in U.S. Appl. No. 13/255,786.
Oct. 17, 2013 Notice of Allowance issued in U.S. Appl. No. 13/202,694.
Oct. 26, 2010 International Search Report issued in International Patent Application No. PCT/JP2010/063135.
Oct. 23, 2013 Office Action issued in U.S. Appl. No. 13/263,272.
Apr. 23, 2014 Office Action issued in U.S. Appl. No. 13/260,986.
Apr. 3, 2014 Office Action issued in U.S. Appl. No. 13/259,574.
Jul. 1, 2014 Office Action issued in U.S. Appl. No. 13/257,789.
May 7, 2014 Office Action issued in U.S. Appl. No. 13/264,062.
May 8, 2014 Office Action issued in U.S. Appl. No. 13/375,674.
U.S. Appl. No. 13/257,789 in the name of Nishioka et al., filed Oct. 14, 2011.
U.S. Appl. No. 13/258,483 in the name of Numata et al., filed Sep. 22, 2011.
U.S. Appl. No. 13/259,574 in the name of Tsukamoto et al., filed Sep. 23, 2011.
U.S. Appl. No. 13/259,885 in the name of Umemoto et al., filed Sep. 23, 2011.
U.S. Appl. No. 13/260,986 in the name of Watanabe et al., filed Sep. 29, 2011.
U.S. Appl. No. 13/263,272 in the name of Bisaiji et al., filed Oct. 6, 2011.
U.S. Appl. No. 13/263,660 in the name of Umemoto et al., filed Oct. 7, 2011.
U.S. Appl. No. 13/264,062 in the name of Watanabe et al., filed Oct. 12, 2011.
U.S. Appl. No. 13/264,594 in the name of Inoue et al., filed Oct. 14, 2011.
U.S. Appl. No. 13/264,884 in the name of Bisaiji et al., filed Oct. 17, 2011.
U.S. Appl. No. 13/375,674 in the name of Inoue et al., filed Dec. 1, 2011.
U.S. Appl. No. 13/578,148 in the name of Umemoto et al., filed Aug. 9, 2012.
U.S. Appl. No. 13/581,186 in the name of Kazuhiro Umemoto et al., filed Aug. 24, 2012.
U.S. Appl. No. 13/580,000 in the name of Bisaiji et al., filed Aug. 20, 2012.
U.S. Appl. No. 13/582,862 in the name of Uenishi et al., filed Sep. 5, 2012.
U.S. Appl. No. 13/582,909 in the name of Kazuhiro Umemoto et al., filed Sep. 5, 2012.

(56) References Cited

OTHER PUBLICATIONS

U.S. Appl. No. 14/152,629 in the name of Umemoto et al., filed Jan. 10, 2014.
U.S. Appl. No. 13/262,001 in the name of Inoue et al., filed Oct. 19, 2011.
Dec. 27, 2011 Written Opinion issued in International Patent Application No. PCT/JP2011/075618 (with translation).
Aug. 6, 2014 Notice of Allowance issued in U.S. Appl. No. 13/259,574.
Nov. 27, 2013 Notice of Allowance issued in U.S. Appl. No. 13/258,483.
Oct. 4, 2013 Notice of Allowance issued in U.S. Appl. No. 13/259,885.
Jun. 15, 2010 International Search Report issued in PCT/JP2010/054740 (with translation).
Jun. 15, 2010 International Search Report issued in International Patent Application No. PCT/JP2010/054731 (with translation).
Jun. 29, 2010 International Search Report issued in International Patent Application No. PCT/JP2010/056345.
Jun. 15, 2010 International. Search Report issued in International Patent Application No. PCT/JP2010/054729.
Sep. 13, 2011 International Search Report issued in International Patent Application No. PCT/JP2011/066628 (with translation).
Jun. 20, 2012 Search Report issued in European Patent Application No. 10845966.0.
Apr. 4, 2013 Office Action issued in U.S. Appl. No. 13/255,710.
Oct. 24, 2013 Office Action issued in U.S. Appl. No. 13/255,710.
Jan. 17, 2013 Office Action issued in U.S. Appl. No. 13/202,733.
Jan. 22, 2014 Office Action issued in U.S. Appl. No. 13/499,211.
May 27, 2014 Office Action issued in U.S. Appl. No. 13/255,710.
Oct. 2, 2014 Office Action issued in U.S. Appl. No. 13/582,862.
Jun. 15, 2010 Written Opinion issued in PCT/JP2010/054740 (with translation).
Sep. 18, 2014 Notice of Allowance issued in U.S. Appl. No. 13/255,710.
Jul. 9, 2013 Notice of Allowance issued in U.S. Appl. No. 13/255,774.
Dec. 9, 2013 Notice of Allowance issued in U.S. Appl. No. 13/262,506.
Dec. 27, 2013 Notice of Allowance issued in U.S. Appl. No. 13/502,210.
U.S. Appl. No. 13/255,774 in the name of Bisaiji et al., filed Sep. 22, 2011.
U.S. Appl. No. 13/255,710 in the name of Bisaiji et al., filed Oct. 12, 2011.
U.S. Appl. No. 13/502,210 in the name of Bisaiji et al., filed Apr. 16, 2012.
U.S. Appl. No. 13/499,211 in the name of Bisaiji et al., filed Mar. 29, 2012.
U.S. Appl. No. 13/934,080 in the name of Bisaiji et al., filed Jul. 2, 2013.
U.S. Appl. No. 13/262,506 in the name of Bisaiji et al., filed Sep. 30, 2011.
Dec. 22, 2014 Office Action issued in U.S. Appl. No. 13/264,230.
Jun. 3, 2015 Office Action issued in U.S. Appl. No. 14/152,629.
Office Action dated Dec. 20, 2013 issued in U.S. Appl. No. 13/264,230.
International Search Report dated Jun. 15, 2010 issued in PCT/JP2010/054730 (with translation).
Written Opinion for PCT Application No. PCT/JP2010/065186 mailed Nov. 22, 2010, dated Nov. 12, 2010 (with translation).
International Search Report for PCT Application No. PCT/JP2010/065186 mailed Nov. 22, 2010 (with translation).
Mar. 15, 2011 International Search Report issued in International Application No. PCT/JP2011/053429.
Nov. 22, 2010 International Search Report issued in International Patent Application No. PCT/JP2010/065187.
Oct. 26, 2012 Office Action issued in U.S. Appl. No. 13/202,692.
U.S. Appl. No. 13/202,692 in the name of Umemoto et al. filed Sep. 20, 2011.
U.S. Appl. No. 13/264,230 in the name of Bisaiji et al. filed Oct. 13, 2011.
U.S. Appl. No. 13/262,858 in the name of Bisaiji et al. filed Oct. 4, 2011.
U.S. Appl. No. 13/202,733 filed Sep. 30, 2011 in the name of Bisaiji et al.
Jul. 24, 2013 Office Action issued in U.S. Appl. No. 13/202,692.
Notice of Allowance dated Nov. 13, 2013 issued in U.S. Appl. No. 13/202,692.

\* cited by examiner

EXHAUST PURIFICATION SYSTEM OF INTERNAL COMBUSTION ENGINE

This is a Division of application Ser. No. 13/202,694 filed Aug. 22, 2011, which in turn is a National Stage Application of PCT/JP2010/054730, filed on Mar. 15, 2010. The disclosure of the prior applications is hereby incorporated by reference herein in its entirety.

TECHNICAL FIELD

The present invention relates to an exhaust purification system of an internal combustion engine.

BACKGROUND ART

Known in the art is an internal combustion engine which arranges, in an engine exhaust passage, an $NO_x$ storage catalyst which stores $NO_x$ which is contained in exhaust gas when the air-fuel ratio of the inflowing exhaust gas is lean and which releases the stored NO when the air-fuel ratio of the inflowing exhaust gas becomes rich, which arranges, in the engine exhaust passage upstream of the $NO_x$ storage catalyst, an oxidation catalyst which has an adsorption function, and which feeds hydrocarbons into the engine exhaust passage upstream of the oxidation catalyst to make the air-fuel ratio of the exhaust gas flowing into the $NO_x$ storage catalyst rich when releasing $NO_x$ from the $NO_x$ storage catalyst (for example, see Patent Literature 1).

In this internal combustion engine, the hydrocarbons which are fed when releasing $NO_x$ from the $NO_x$ storage catalyst are made gaseous hydrocarbons at the oxidation catalyst, and the gaseous hydrocarbons are fed to the $NO_x$ storage catalyst. As a result, the $NO_x$ which is released from the $NO_x$ storage catalyst is reduced well.

CITATION LIST

Patent Literature

Patent Literature 1: Japanese Patent No. 3969450

SUMMARY OF INVENTION

Technical Problem

However, there is the problem that when the $NO_x$ storage catalyst becomes a high temperature, the $NO_x$ purification rate falls.

An object of the present invention is to provide an exhaust purification system of an internal combustion engine which can obtain a high $NO_x$ purification rate even if the temperature of the exhaust purification catalyst becomes a high temperature.

Solution to Problem

According to the present invention, there is provided an exhaust purification system of an internal combustion engine wherein an exhaust purification catalyst is arranged in an engine exhaust passage for reacting $NO_x$ contained in exhaust gas and reformed hydrocarbons, a precious metal catalyst is carried on an exhaust gas flow surface of the exhaust purification catalyst and a basic exhaust gas flow surface part is formed around the precious metal catalyst, the exhaust purification catalyst has a property of reducing the $NO_x$ which is contained in the exhaust gas if causing variation of a concentration of hydrocarbons flowing into the exhaust purification catalyst by within a predetermined range of amplitude and within a predetermined range of period and has a property of being increased in storage amount of $NO_x$ which is contained in the exhaust gas if lengthening the vibration period of the hydrocarbon concentration more than the predetermined range, and, at the time of engine operation, the concentration of hydrocarbons flowing into the exhaust purification catalyst is made to vibrate by within the predetermined range of amplitude and within the predetermined range of period and thereby reduce the $NO_x$ which is contained in the exhaust gas in the exhaust purification catalyst.

Advantageous Effects of Invention

Even if the temperature of the exhaust purification catalyst becomes a high temperature, a high $NO_x$ purification rate can be obtained.

BRIEF DESCRIPTION OF DRAWINGS

FIG. 34 is a flow chart for calculating a lean shift amount $\Delta(A/F)$in.

DESCRIPTION OF EMBODIMENTS

Figure 1:
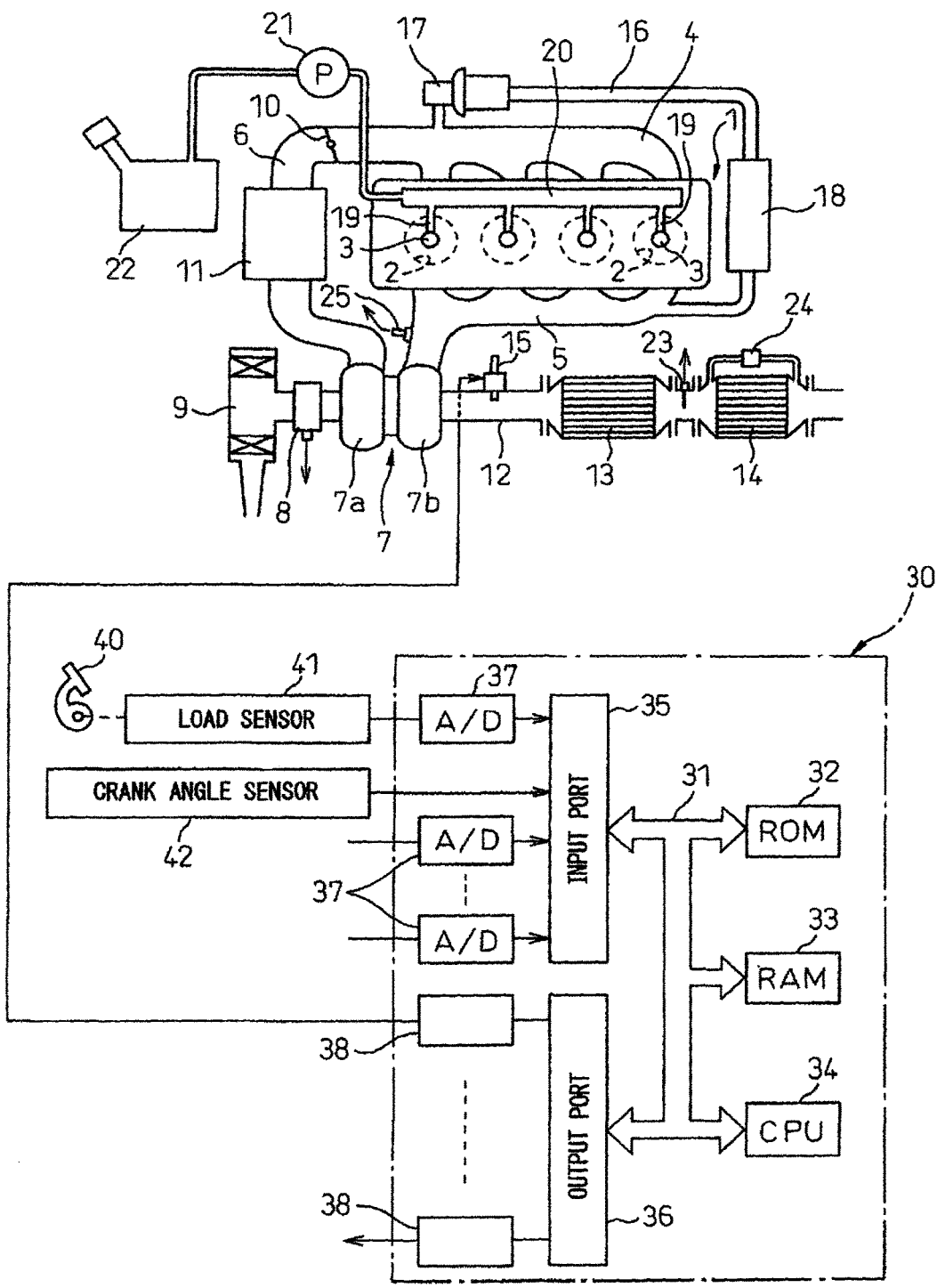
FIG. 1 is an overall view of a compression ignition type internal combustion engine.

FIG. 1 is an overall view of a compression ignition type internal combustion engine.

Referring to FIG. 1, 1 indicates an engine body, 2 a combustion chamber of each cylinder, 3 an electronically controlled fuel injector for injecting fuel into each combustion chamber 2, 4 an intake manifold, and 5 an exhaust manifold. The intake manifold 4 is connected through an intake duct 6 to an outlet of a compressor 7a of an exhaust turbocharger 7, while an inlet of the compressor 7a is connected through an intake air amount detector 8 to an air cleaner 9. Inside the intake duct 6, a throttle valve 10 driven by a step motor is arranged. Furthermore, around the intake duct 6, a cooling device 11 is arranged for cooling the intake air which flows through the inside of the intake duct 6. In the embodiment shown in FIG. 1, the engine cooling water is guided to the inside of the cooling device 11 where the engine cooling water is used to cool the intake air.

On the other hand, the exhaust manifold 5 is connected to an inlet of an exhaust turbine 7b of the exhaust turbocharger 7. The outlet of the exhaust turbine 7b is connected through an exhaust pipe 12 to an inlet of the exhaust purification catalyst 13, while the outlet of the exhaust purification catalyst 13 is connected to a particulate filter 14 for trapping particulate which is contained in the exhaust gas. Inside the exhaust pipe 12 upstream of the exhaust purification catalyst 13, a hydrocarbon feed valve 15 is arranged for feeding hydrocarbons comprised of diesel oil or other fuel used as fuel for a compression ignition type internal combustion engine. In the embodiment shown in FIG. 1, diesel oil is used as the hydrocarbons which are fed from the hydrocarbon feed valve 15. Note that, the present invention can also be applied to a spark ignition type internal combustion engine in which fuel is burned under a lean air-fuel ratio. In this case, from the hydrocarbon feed valve 15, hydrocarbons comprised of gasoline or other fuel used as fuel of a spark ignition type internal combustion engine are fed.

On the other hand, the exhaust manifold 5 and the intake manifold 4 are connected with each other through an exhaust gas recirculation (hereinafter referred to as an "EGR") passage 16. Inside the EGR passage 16, a electronically controlled EGR control valve 17 is arranged. Further, around the EGR passage 16, a cooling device 18 is arranged for cooling EGR gas flowing through the inside of the EGR passage 16. In the embodiment shown in FIG. 1, the engine cooling water is guided to the inside of the cooling device 18 where the engine cooling water is used to cool the EGR gas. On the other hand, each fuel injector 3 is connected through a fuel feed tube 19 to a common rail 20. This common rail 20 is connected through an electronically controlled variable discharge fuel pump 21 to a fuel tank 22. The fuel which is stored inside of the fuel tank 22 is fed by the fuel pump 21 to the inside of the common rail 20. The fuel which is fed to the inside of the common rail 20 is fed through each fuel feed tube 19 to the fuel injector 3.

An electronic control unit 30 is comprised of a digital computer provided with a ROM (read only memory) 32, a RAM (random access memory) 33, a CPU (microprocessor) 34, an input port 35, and an output port 36, which are connected with each other by a bidirectional bus 31. Downstream of the exhaust purification catalyst 13, a temperature sensor 23 is attached for detecting the exhaust gas temperature. The particulate filter 14 has a differential pressure sensor 24 attached for detecting the differential pressure before and after the particulate filter 14. Further, at the collecting portion of the exhaust manifold 5, an air-fuel ratio sensor 25 is arranged. The output signals of these temperature sensor 23, differential pressure sensor 24, air-fuel ratio sensor 25, and intake air amount detector 8 are input through corresponding AD converters 37 to the input port 35. Further, an accelerator pedal 40 has a load sensor 41 connected to it which generates an output voltage proportional to the amount of depression L of the accelerator pedal 40. The output voltage of the load sensor 41 is input through a corresponding AD converter 37 to the input port 35. Furthermore, at the input port 35, a crank angle sensor 42 is connected which generates an output pulse every time a crankshaft rotates by, for example, 15°. On the other hand, the output port 36 is connected through corresponding drive circuits 38 to each fuel injector 3, step motor for driving the throttle valve 10, hydrocarbon feed valve 15, EGR control valve 17, and fuel pump 21.

Figure 2:
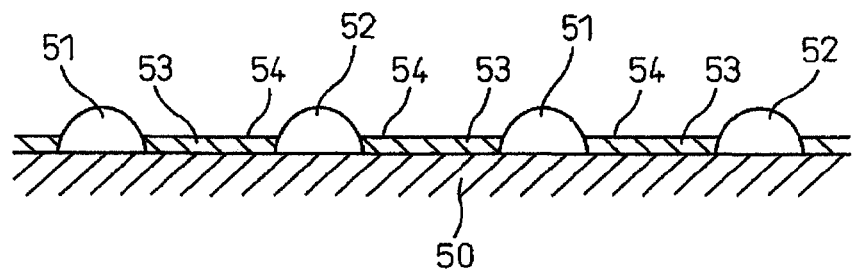
FIG. 2 is a view schematically showing a surface part of a catalyst carrier.

FIG. 2 schematically shows a surface part of a catalyst carrier which is carried on a substrate of the exhaust purification catalyst 13. At this exhaust purification catalyst 13, as shown in FIG. 2, for example, there is provided a catalyst carrier 50 made of alumina on which precious metal catalysts 51 and 52 are carried. Furthermore, on this catalyst carrier 50, a basic layer 53 is formed which includes at least one element selected from potassium K, sodium Na, cesium Cs, or another such alkali metal, barium Ba, calcium Ca, or another such alkali earth metal, a lanthanoid or another such rare earth and silver Ag, copper Cu, iron Fe, iridium Ir, or another metal able to donate electrons to $NO_x$. The exhaust gas flows along the top of the catalyst carrier 50, so the precious metal catalysts 51 and 52 can be said to be carried on the exhaust gas flow surface of the exhaust purification catalyst 13. Further, the surface of the basic layer 53 exhibits basicity, so the surface of the basic layer 53 is called the basic exhaust gas flow surface part 54.

On the other hand, in FIG. 2, the precious metal catalyst 51 is comprised of platinum Pt, while the precious metal catalyst 52 is comprised of rhodium Rh. That is, the precious metal catalysts 51 and 52 which are carried on the catalyst carrier 50 are comprised of platinum Pt and rhodium Rh. Note that, on the catalyst carrier 50 of the exhaust purification catalyst 13, in addition to platinum Pt and rhodium Rh, palladium Pd may be further carried or, instead of rhodium Rh, palladium Pd may be carried. That is, the precious metal catalysts 51 and 52 which are carried on the catalyst carrier 50 are comprised of platinum Pt and at least one of rhodium Rh and palladium Pd.

Figure 3:
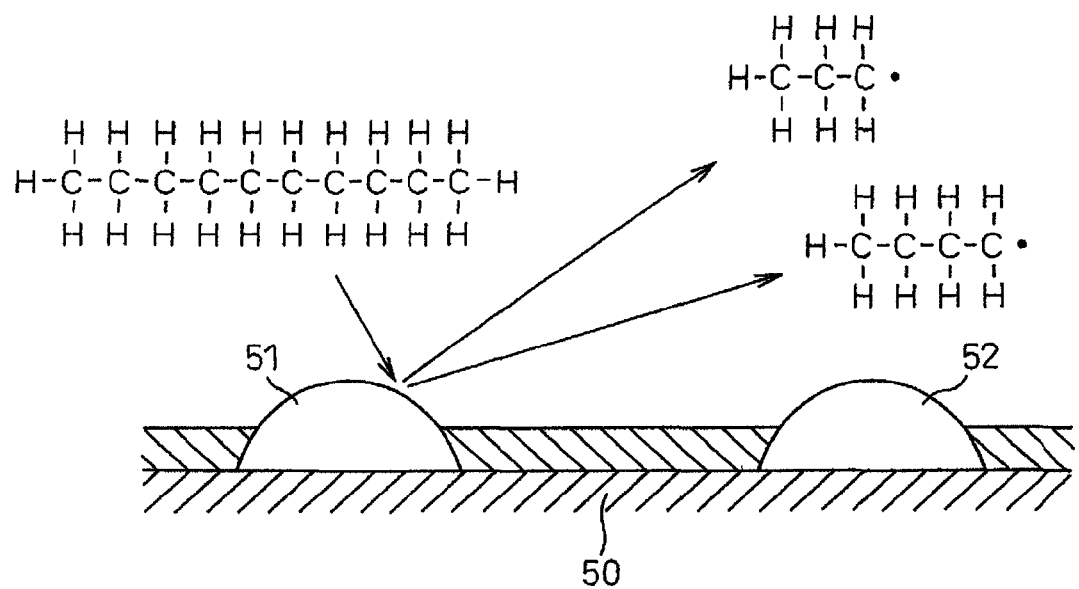
FIG. 3 is a view for explaining an oxidation reaction in an exhaust purification catalyst.

If hydrocarbons are injected from the hydrocarbon feed valve 15 into the exhaust gas, the hydrocarbons are reformed by the exhaust purification catalyst 13. In the present invention, at this time, the reformed hydrocarbons are used to remove the $NO_x$ at the exhaust purification catalyst 13. FIG. 3 schematically shows the reforming action performed at the exhaust purification catalyst 13 at this time. As shown in FIG. 3, the hydrocarbons HC which are injected from the hydrocarbon feed valve 15 become radical hydrocarbons HC with a small carbon number by the catalyst 51.

Note that, even if injecting fuel, that is, hydrocarbons, from the fuel injector 3 into the combustion chamber 2 during the latter half of the expansion stroke or during the exhaust stroke, the hydrocarbons are reformed inside of the combustion chamber 2 or at the exhaust purification catalyst 13, and the $NO_x$ which is contained in the exhaust gas is removed by the reformed hydrocarbons at the exhaust purification catalyst 13. Therefore, in the present invention, instead of feeding hydrocarbons from the hydrocarbon feed valve 15 to the inside of the engine exhaust passage, it is also possible to feed hydrocarbons into the combustion chamber 2 during the latter half of the expansion stroke or during the exhaust stroke. In this way, in the present invention, it is also possible to feed hydrocarbons to the inside of the combustion chamber 2, but below the present invention is explained taking as an example the case of injecting hydrocarbons from the hydrocarbon feed valve 15 to the inside of the engine exhaust passage.

Figure 4:
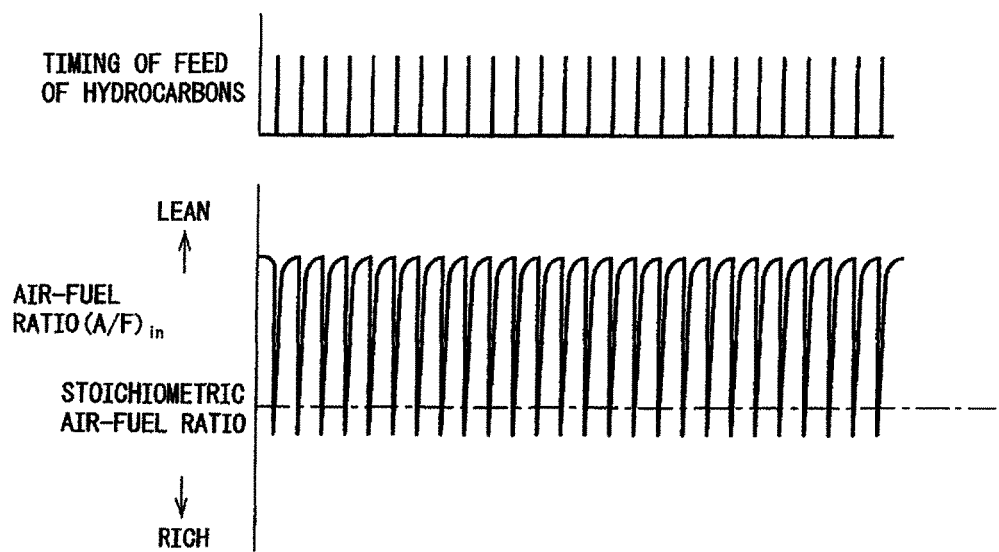
FIG. 4 is a view showing a change of an air-fuel ratio of exhaust gas flowing into an exhaust purification catalyst.

FIG. 4 shows the timing of feeding hydrocarbons from the hydrocarbon feed valve 15 and the changes in the air-fuel ratio (A/F)in of the exhaust gas flowing into the exhaust purification catalyst 13. Note that, the changes in the air-fuel ratio (A/F)in depend on the change in concentration of the hydrocarbons in the exhaust gas which flows into the exhaust purification catalyst 13, so it can be said that the change in the air-fuel ratio (A/F)in shown in FIG. 4 expresses the change in concentration of the hydrocarbons. However, if the hydrocarbon concentration becomes higher, the air-fuel ratio (A/F)in becomes smaller, so, in FIG. 4, the more to the rich side the air-fuel ratio (A/F)in becomes, the higher the hydrocarbon concentration.

Figure 5:
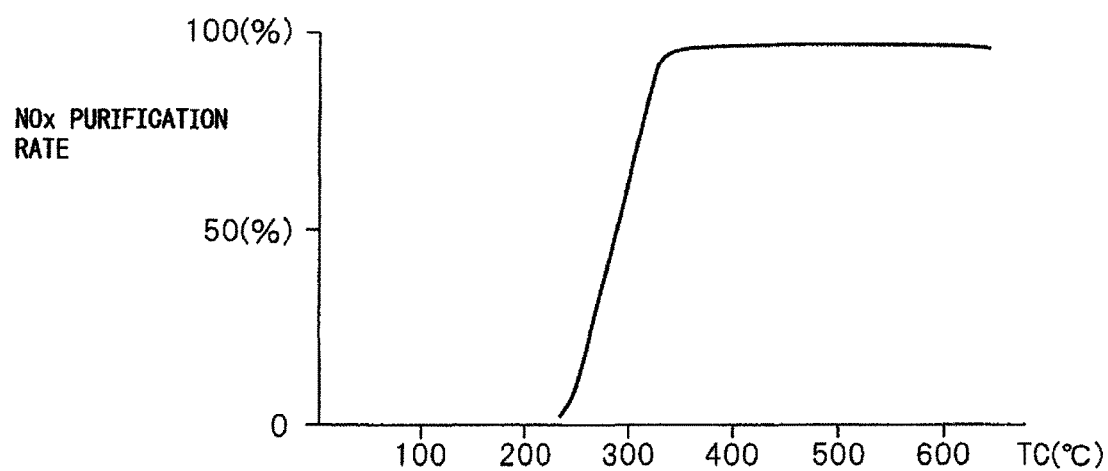
FIG. 5 is a view showing an $NO_x$ purification rate.

FIG. 5 shows the $NO_x$ purification rate by the exhaust purification catalyst 13 with respect to the catalyst temperatures of the exhaust purification catalyst 13 when periodically making the concentration of hydrocarbons flowing into the exhaust purification catalyst 13 change so as to, as shown in FIG. 4, make the air-fuel ratio (A/F)in of the exhaust gas flowing to the exhaust purification catalyst 13 change. The inventors engaged in research relating to $NO_x$ purification for a long time. In the process of research, they learned that if making the concentration of hydrocarbons flowing into the exhaust purification catalyst 13 vibrate by within a predetermined range of amplitude and within a predetermined range of period, as shown in FIG. 5, an extremely high $NO_x$ purification rate is obtained even in a 400° C. or higher high temperature region.

Figure 6A:
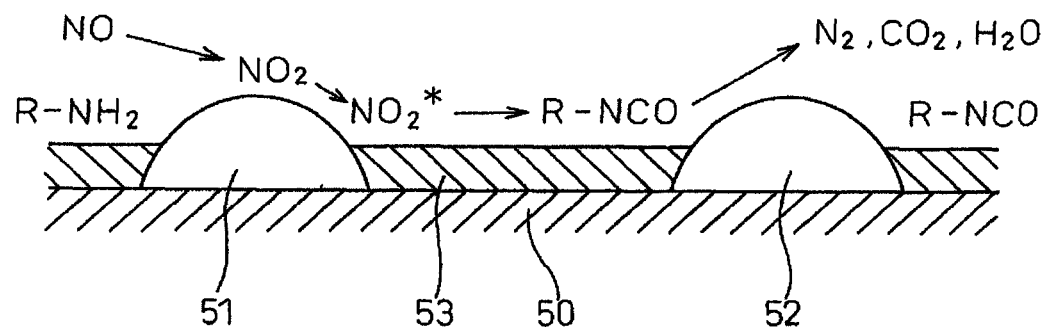
FIG. 6A and 6B are views for explaining an oxidation reduction reaction in an exhaust purification catalyst.
Figure 6B:
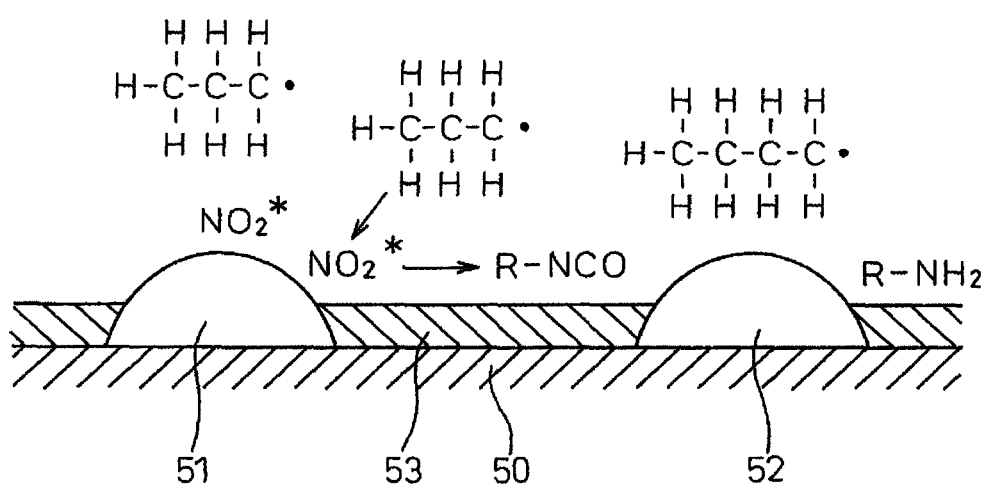

Furthermore, at this time, a large amount of reducing intermediate containing nitrogen and hydrocarbons continues to be held or adsorbed on the surface of the basic layer 53, that is, on the basic exhaust gas flow surface part 54 of the exhaust purification catalyst 13. It is learned that this reducing intermediate plays a central role in obtaining a high $NO_x$ purification rate. Next, this will be explained with reference to FIGS. 6A and 6B. Note that, these FIGS. 6A and 6B schematically show the surface part of the catalyst carrier 50 of the exhaust purification catalyst 13. These FIGS. 6A and 6B show the reaction which is presumed to occur when the concentration of hydrocarbons flowing into the exhaust purification catalyst 13 is made to vibrate by within a predetermined range of amplitude and within a predetermined range of period.

FIG. 6A shows when the concentration of hydrocarbons flowing into the exhaust purification catalyst 13 is low, while FIG. 6B shows when hydrocarbons are fed from the hydrocarbon feed valve 15 and the concentration of hydrocarbons flowing into the exhaust purification catalyst 13 becomes high.

Now, as will be understood from FIG. 4, the air-fuel ratio of the exhaust gas which flows into the exhaust purification catalyst 13 is maintained lean except for an instant, so the exhaust gas which flows into the exhaust purification catalyst 13 normally becomes a state of oxygen excess. Therefore, the NO which is contained in the exhaust gas, as shown in FIG. 6A, is oxidized on the platinum 51 and becomes $NO_2$. Next, this $NO_2$ is supplied with electrons from the platinum 51 and becomes $NO_2^-$. Therefore, a large amount of $NO_2^-$ is produced on the platinum 51. This $NO_2^-$ is strong in activity. Above, this $NO_2^-$ is called the active $NO_2^*$.

On the other hand, if hydrocarbons are fed from the hydrocarbon feed valve 15, as shown in FIG. 3, the hydrocarbons are reformed and become radicalized inside of the exhaust purification catalyst 13. As a result, as shown in FIG. 6B, the hydrocarbon concentration around the active $NO_2^*$ becomes higher. In this regard, after the active $NO_2^*$ is produced, if the state of a high oxygen concentration around the active $NO_2^*$ continues for a predetermined time or more, the active $NO_2^*$ is oxidized and is absorbed in the basic layer 53 in the form of nitrate ions $NO_3^-$. However, if the hydrocarbon concentration around the active $NO_2^*$ is made higher before this predetermined time passes, as shown in FIG. 6B, the active $NO_2^*$ reacts on the platinum 51 with the radical hydrocarbons HC whereby a reducing intermediate is produced. This reducing intermediate is adhered or adsorbed on the surface of the basic layer 53.

Note that, at this time, the first produced reducing intermediate is considered to be a nitro compound R—$NO_2$. If this nitro compound R—$NO_2$ is produced, the result becomes a nitrile compound R—CN, but this nitrile compound R-CN can only survive for an instant in this state, so immediately becomes an isocyanate compound R—NCO. This isocyanate compound R—NCO, when hydrolyzed, becomes an amine compound R—$NH_2$. However, in this case, what is hydrolyzed is considered to be part of the isocyanate compound R—NCO. Therefore, as shown in FIG. 6B, the majority of the reducing intermediate which is held or adsorbed on the surface of the basic layer 53 is believed to be the isocyanate compound R—NCO and amine compound R—NH$_2$.

On the other hand, as shown in FIG. 6B, if the produced reducing intermediate is surrounded by the hydrocarbons HC, the reducing intermediate is blocked by the hydrocarbons HC and the reaction will not proceed any further. In this case, if the concentration of hydrocarbons flowing into the exhaust purification catalyst 13 is lowered and thereby the oxygen concentration becomes higher, the hydrocarbons around the reducing intermediate will be oxidized. As a result, as shown in FIG. 6A, the reducing intermediate and the active NO$_2$* will react. At this time, the active NO$_2$* reacts with the reducing intermediate R—NCO or R—NH$_2$ to form N$_2$, CO$_2$, and H$_2$O and consequently the NO is removed.

In this way, in the exhaust purification catalyst 13, by making the concentration of hydrocarbons flowing into the exhaust purification catalyst 13 higher, a reducing intermediate is produced. By making the concentration of hydrocarbons flowing into the exhaust purification catalyst 13 lower and raising the oxygen concentration, the active NO$_2$* reacts with the reducing intermediate and the NO is removed. That is, in order for the exhaust purification catalyst 13 to remove the NO$_R$, the concentration of hydrocarbons flowing into the exhaust purification catalyst 13 has to be periodically changed.

Of course, in this case, it is necessary to raise the concentration of hydrocarbons to a concentration sufficiently high for producing the reducing intermediate and it is necessary to lower the concentration of hydrocarbons to a concentration sufficiently low for making the produced reducing intermediate react with the active NO$_2$*. That is, it is necessary to make the concentration of hydrocarbons flowing into the exhaust purification catalyst 13 vibrate by within a predetermined range of amplitude. Note that, in this case, it is necessary to hold a sufficient amount of reducing intermediate R—NCO or R—NH$_2$ on the basic layer 53, that is, the basic exhaust gas flow surface part 24, until the produced reducing intermediate reacts with the active NO$_2$*. For this reason, the basic exhaust gas flow surface part 24 is provided.

On the other hand, if lengthening the feed period of the hydrocarbons, the time in which the oxygen concentration becomes higher becomes longer in the period after the hydrocarbons are fed until the hydrocarbons are next fed. Therefore, the active NO$_2$* is absorbed in the basic layer 53 in the form of nitrates without producing a reducing intermediate. To avoid this, it is necessary to make the concentration of hydrocarbons flowing into the exhaust purification catalyst 13 vibrate by within a predetermined range of period.

Therefore, in an embodiment of the present invention, to make the NO$_x$ contained in the exhaust gas and the reformed hydrocarbons react and produce the reducing intermediate R—NCO or R—NH$_2$ containing nitrogen and hydrocarbons, precious metal catalysts 51 and 52 are carried on the exhaust gas flow surface of the exhaust purification catalyst 13. To hold the produced reducing intermediate R—NCO or R—NH$_2$ inside the exhaust purification catalyst 13, a basic exhaust gas flow surface part 54 is formed around the precious metal catalysts 51 and 52. Due to the reducing action of the reducing intermediate R—NCO or R—NH$_2$ which is held on the basic exhaust gas flow surface part 54, the NO is reduced. The vibration period of the hydrocarbon concentration is made the vibration period required for continuation of the production of the reducing intermediate R—NCO or R—NH$_2$. Incidentally, in the example shown in FIG. 4, the injection interval is made 3 seconds.

Figure 7A:
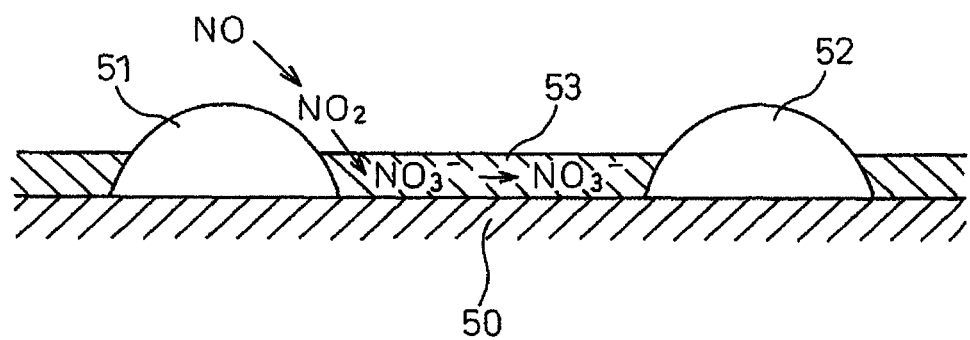
FIG. 7A and 7B are views for explaining an oxidation reduction reaction in an exhaust purification catalyst.

If the vibration period of the hydrocarbon concentration, that is, the feed period of the hydrocarbons HC, is made longer than the above predetermined range of period, the reducing intermediate R—NCO or R—NH$_2$ disappears from the surface of the basic layer 53. At this time, the active NO$_2$* which is produced on the platinum Pt 53, as shown in FIG. 7A, diffuses in the basic layer 53 in the form of nitrate ions NO$_3$$^-$ and becomes nitrates. That is, at this time, the NO$_x$ in the exhaust gas is absorbed in the form of nitrates inside of the basic layer 53.

Figure 7B:
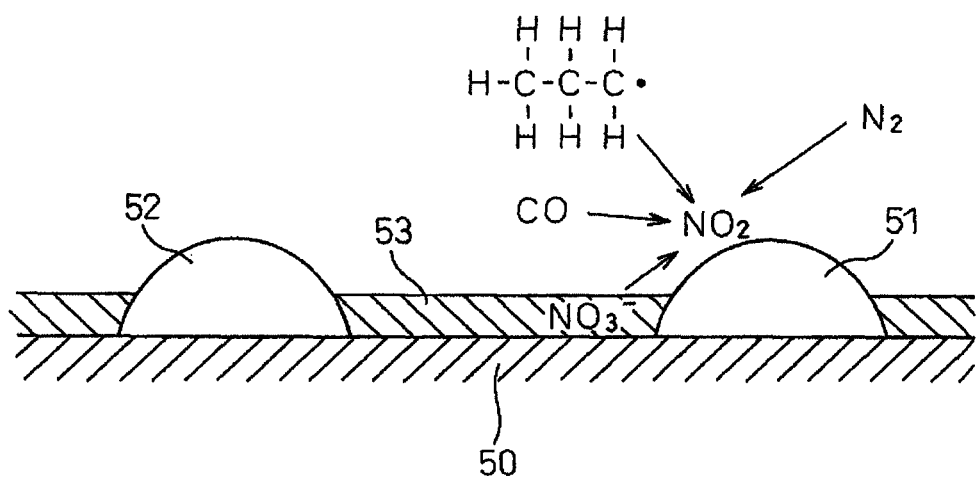

On the other hand, FIG. 7B shows the case where the air-fuel ratio of the exhaust gas which flows into the exhaust purification catalyst 13 is made the stoichiometric air-fuel ratio or rich when the NO is absorbed in the form of nitrates inside of the basic layer 53. In this case, the oxygen concentration in the exhaust gas falls, so the reaction proceeds in the opposite direction (NO$_3$$^-$→NO$_2$) and consequently the nitrates absorbed in the basic layer 53 become nitrate ions NO$_3$$^-$ one by one and, as shown in FIG. 7B, are released from the basic layer 53 in the form of NO$_2$. Next, the released NO$_2$ is reduced by the hydrocarbons HC and CO contained in the exhaust gas.

Figure 8:
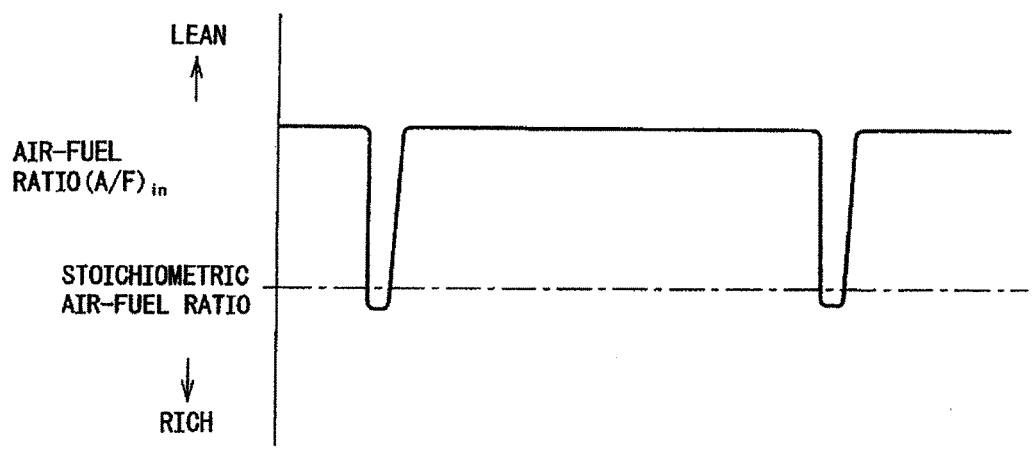
FIG. 8 is a view showing a change of an air-fuel ratio of exhaust gas flowing into an exhaust purification catalyst.

FIG. 8 shows the case of making the air-fuel ratio (A/F)in of the exhaust gas which flows into the exhaust purification catalyst 13 temporarily rich slightly before the NO absorption ability of the basic layer 53 becomes saturated. Note that, in the example shown in FIG. 8, the time interval of this rich control is 1 minute or more. In this case, the NO which was absorbed in the basic layer 53 when the air-fuel ratio (A/F)in of the exhaust gas was lean is released all at once from the basic layer 53 and reduced when the air-fuel ratio (A/F)in of the exhaust gas is made temporarily rich. Therefore, in this case, the basic layer 53 plays the role of an absorbent for temporarily absorbing NO$_R$.

Note that, at this time, sometimes the basic layer 53 temporarily adsorbs the NO$_R$. Therefore, if using term of storage as a term including both absorption and adsorption, at this time, the basic layer 53 performs the role of an NO storage agent for temporarily storing the NO$_R$. That is, in this case, if the ratio of the air and fuel (hydrocarbons) which are fed into the engine intake passage, combustion chambers 2, and exhaust passage upstream of the exhaust purification catalyst 13 is called the air-fuel ratio of the exhaust gas, the exhaust purification catalyst 13 functions as an NO storage catalyst which stores the NO when the air-fuel ratio of the exhaust gas is lean and releases the stored NO when the oxygen concentration in the exhaust gas falls.

Figure 9:
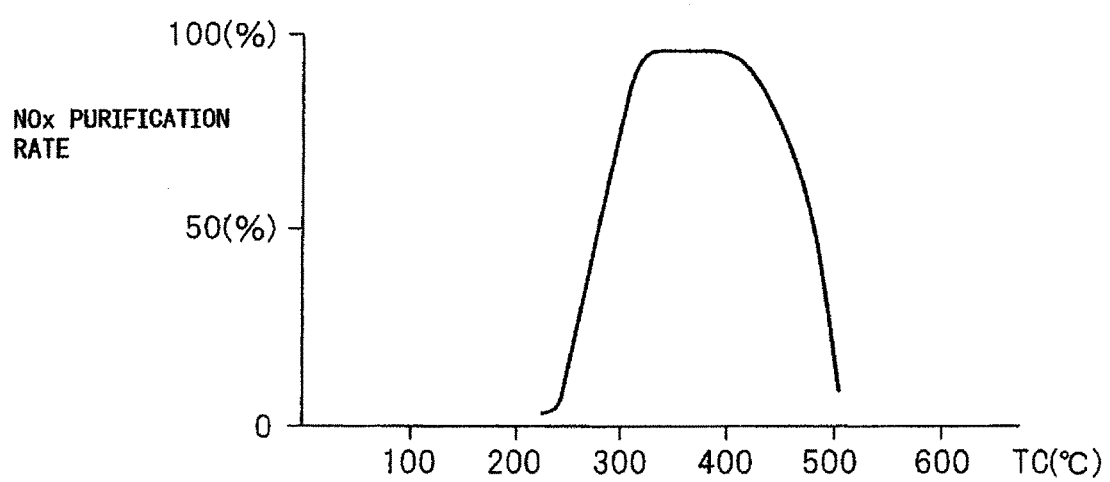
FIG. 9 is a view of an $NO_x$ purification rate.

FIG. 9 shows the NO purification rate when making the exhaust purification catalyst 13 function as an NO storage catalyst in this way. Note that, the abscissa of the FIG. 9 shows the catalyst temperature TC of the exhaust purification catalyst 13. When making the exhaust purification catalyst 13 function as an NO storage catalyst, as shown in FIG. 9, when the catalyst temperature TC is 300° C. to 400° C., an extremely high NO purification rate is obtained, but when the catalyst temperature TC becomes a 400° C. or higher high temperature, the NO$_x$ purification rate falls.

In this way, when the catalyst temperature TC becomes 400° C. or more, the NO purification rate falls because if the catalyst temperature TC becomes 400° C. or more, the nitrates break down by heat and are released in the form of NO$_2$ from the exhaust purification catalyst 13. That is, so long as storing NO in the form of nitrates, when the catalyst temperature TC is high, it is difficult to obtain a high NO purification rate. However, in the new NO$_x$ purification method shown from FIG. 4 to FIGS. 6A and 6B, as will be understood from FIGS. 6A and 6B, nitrates are not formed or even if formed are extremely fine in amount, consequently, as shown in FIG. 5, even when the catalyst temperature TC is high, a high $NO_x$ purification rate is obtained.

Therefore, in the present invention, an exhaust purification catalyst 13 is arranged in the engine exhaust passage for making the NO contained in the exhaust gas and the reformed hydrocarbon react. Precious metal catalysts 51 and 52 are carried on the exhaust gas flow surface of the exhaust purification catalyst 13. Around the precious metal catalysts 51 and 52, a basic exhaust gas flow surface part 54 is formed. The exhaust purification catalyst 13 has the property of reducing the $NO_x$ which is contained in the exhaust gas if making the concentration of hydrocarbons flowing into the exhaust purification catalyst 13 vibrate by within a predetermined range of amplitude and within a predetermined range of period and has the property of the storage amount of the $NO_x$ which is contained in the exhaust gas increasing if making the vibration period of the hydrocarbon concentration longer than this predetermined range. At the time of engine operation, the concentration of hydrocarbons flowing into the exhaust purification catalyst 13 is made to vibrate by within the predetermined range of amplitude and within the predetermined range of period. Due to this, the $NO_x$ which is contained in the exhaust gas is reduced in the exhaust purification catalyst 13.

That is, the $NO_x$ purification method which is shown from FIG. 4 to FIGS. 6A and 6B can be said to be a new $NO_x$ purification method designed to remove $NO_x$ without forming almost any nitrates in the case of using an exhaust purification catalyst which carries a precious metal catalyst and forms a basic layer which can absorb $NO_x$. In actuality, when using this new $NO_x$ purification method, the nitrates which are detected from the basic layer 53 become much smaller in amount compared with the case where making the exhaust purification catalyst 13 function as an $NO_x$ storage catalyst.

Next, referring to FIG. 10 to FIG. 15, the new $NO_x$ purification method which is shown in FIG. 4 to FIGS. 6A and 6B will be explained in a bit more detail.

Figure 10:
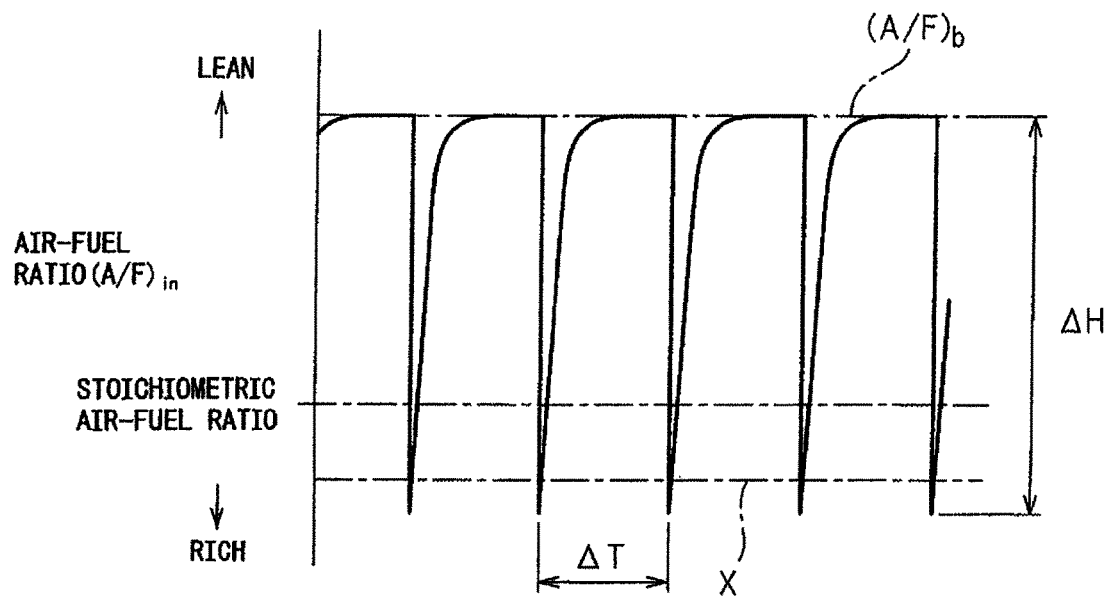
FIG. 10 is a time chart showing a change of an air-fuel ratio of exhaust gas flowing into an exhaust purification catalyst.

FIG. 10 shows enlarged the change in the air-fuel ratio (A/F)in shown in FIG. 4. Note that, as explained above, the change in the air-fuel ratio (A/F)in of the exhaust gas flowing into this exhaust purification catalyst 13 simultaneously shows the change in concentration of the hydrocarbons which flow into the exhaust purification catalyst 13. Note that, in FIG. 10, ΔH shows the amplitude of the change in concentration of hydrocarbons HC which flow into the exhaust purification catalyst 13, while ΔT shows the vibration period of the concentration of the hydrocarbons which flow into the exhaust purification catalyst 13.

Furthermore, in FIG. 10, (A/F)b shows the base air-fuel ratio which shows the air-fuel ratio of the combustion gas for generating the engine output. In other words, this base air-fuel ratio (A/F)b shows the air-fuel ratio of the exhaust gas which flows into the exhaust purification catalyst 13 when stopping the feed of hydrocarbons. On the other hand, in FIG. 10, X shows the upper limit of the air-fuel ratio (A/F)in which is used for producing the reducing intermediate without the produced active $NO_2^*$ being stored in the form of nitrates inside the basic layer 53. To make the active $NO_2^*$ and the reformed hydrocarbons react and produce the reducing intermediate, it is necessary to make the air-fuel ratio (A/F)in lower than the upper limit X of this air-fuel ratio.

In other words, in FIG. 10, X shows the lower limit of the concentration of hydrocarbons required for making the active $NO_2^*$ and reformed hydrocarbon react to produce a reducing intermediate. To produce the reducing intermediate, the concentration of hydrocarbons has to be made higher than this lower limit X. In this case, whether the reducing intermediate is produced is determined by the ratio of the oxygen concentration and hydrocarbon concentration around the active $NO_2^*$, that is, the air-fuel ratio (A/F)in. The upper limit X of the air-fuel ratio required for producing the reducing intermediate will below be called the demanded minimum air-fuel ratio.

In the example shown in FIG. 10, the demanded minimum air-fuel ratio X becomes rich. Therefore, in this case, to produce the reducing intermediate, the air-fuel ratio (A/F)in is instantaneously made the demanded minimum air-fuel ratio X or less, that is, is made rich. As opposed to this, in the example shown in FIG. 11, the demanded minimum air-fuel ratio X becomes lean. In this case, the reducing intermediate is produced by maintaining the air-fuel ratio (A/F)in lean and periodically making the air-fuel ratio (A/F)in fall.

In this case, whether the demanded minimum air-fuel ratio X becomes rich or becomes lean depends on the oxidizing strength of the exhaust purification catalyst 13. In this case, the exhaust purification catalyst 13, for example, becomes stronger in oxidizing strength if increasing the carried amount of the precious metal 51 and becomes stronger in oxidizing strength if strengthening the acidity. Therefore, the oxidizing strength of the exhaust purification catalyst 13 changes due to the carried amount of the precious metal 51 or the strength of the acidity.

Figure 11:
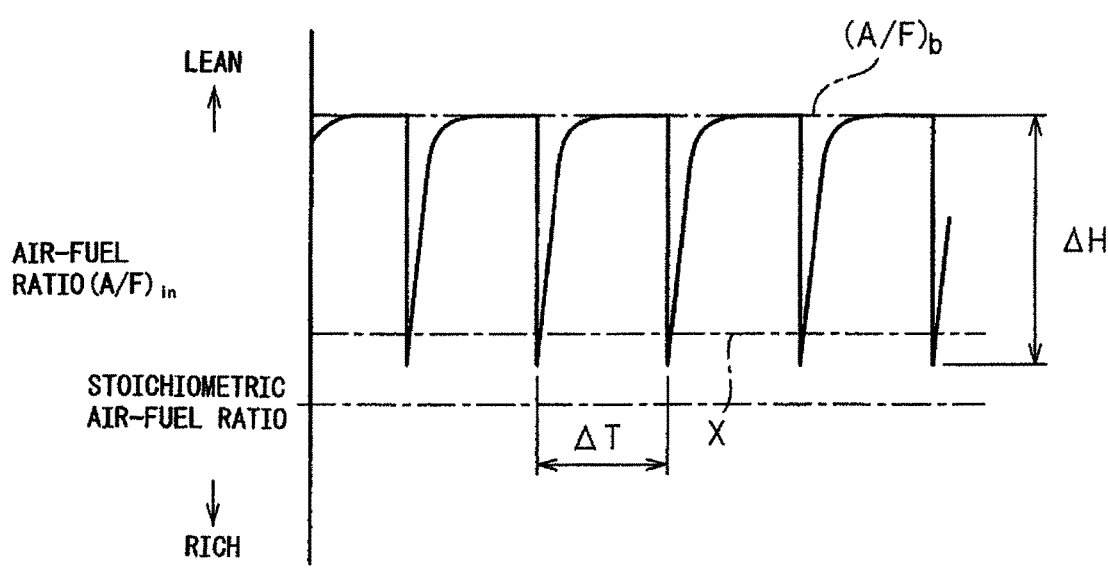
FIG. 11 is a time chart showing a change of an air-fuel ratio of exhaust gas flowing into an exhaust purification catalyst.

Now, if using an exhaust purification catalyst 13 with a strong oxidizing strength, as shown in FIG. 11, if maintaining the air-fuel ratio (A/F)in lean while periodically lowering the air-fuel ratio (A/F)in, the hydrocarbons end up becoming completely oxidized when the air-fuel ratio (A/F) in is reduced. As a result, the reducing intermediate can no longer be produced. As opposed to this, when using an exhaust purification catalyst 13 with a strong oxidizing strength, as shown in FIG. 10, if making the air-fuel ratio (A/F)in periodically rich, when the air-fuel ratio (A/F)in is made rich, the hydrocarbons will be partially oxidized, without being completely oxidized, that is, the hydrocarbons will be reformed, consequently the reducing intermediate will be produced. Therefore, when using an exhaust purification catalyst 13 with a strong oxidizing strength, the demanded minimum air-fuel ratio X has to be made rich.

On the other hand, when using an exhaust purification catalyst 13 with a weak oxidizing strength, as shown in FIG. 11, if maintaining the air-fuel ratio (A/F)in lean while periodically lowering the air-fuel ratio (A/F)in, the hydrocarbons will be partially oxidized without being completely oxidized, that is, the hydrocarbons will be reformed and consequently the reducing intermediate will be produced. As opposed to this, when using an exhaust purification catalyst 13 with a weak oxidizing strength, as shown in FIG. 10, if making the air-fuel ratio (A/F)in periodically rich, a large amount of hydrocarbons will be exhausted from the exhaust purification catalyst 13 without being oxidized and consequently the amount of hydrocarbons which is wastefully consumed will increase. Therefore, when using an exhaust purification catalyst 13 with a weak oxidizing strength, the demanded minimum air-fuel ratio X has to be made lean.

Figure 12:
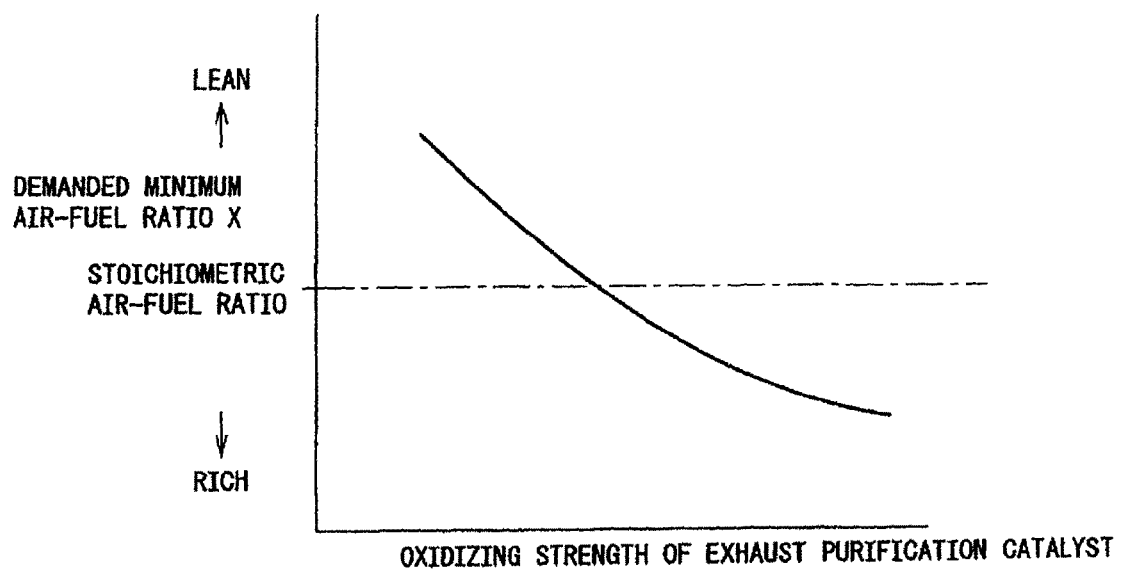
FIG. 12 is a view showing a relationship between an oxidizing strength of an exhaust purification catalyst and a demanded minimum air-fuel ratio X.

That is, it is learned that the demanded minimum air-fuel ratio X, as shown in FIG. 12, is reduced the stronger the oxidizing strength of the exhaust purification catalyst 13. In this way the demanded minimum air-fuel ratio X becomes lean or rich due to the oxidizing strength of the exhaust purification catalyst 13. Below, taking as example the case where the demanded minimum air-fuel ratio X is rich, the amplitude of the change in concentration of hydrocarbons flowing into the exhaust purification catalyst 13 and the vibration period of the concentration of hydrocarbons flowing into the exhaust purification catalyst 13 will be explained.

Now, if the base air-fuel ratio (A/F)b becomes larger, that is, if the oxygen concentration in the exhaust gas before the hydrocarbons are fed becomes higher, the feed amount of hydrocarbons required for making the air-fuel ratio (A/F)in the demanded minimum air-fuel ratio X or less increases and along with this the excess amount of hydrocarbons which did not contribute the production of the reducing intermediate also increases. In this case, to remove the $NO_x$ well, as explained above, it is necessary to make the excess hydrocarbons oxidize. Therefore, to remove the $NO_x$ well, the larger the amount of excess hydrocarbons, the larger the amount of oxygen which is required.

In this case, if raising the oxygen concentration in the exhaust gas, the amount of oxygen can be increased. Therefore, to remove the $NO_x$ well, when the oxygen concentration in the exhaust gas before the hydrocarbons are fed is high, it is necessary to raise the oxygen concentration in the exhaust gas after feeding the hydrocarbons. That is, the higher the oxygen concentration in the exhaust gas before the hydrocarbons are fed, the larger the amplitude of the hydrocarbon concentration has to be made.

Figure 13:
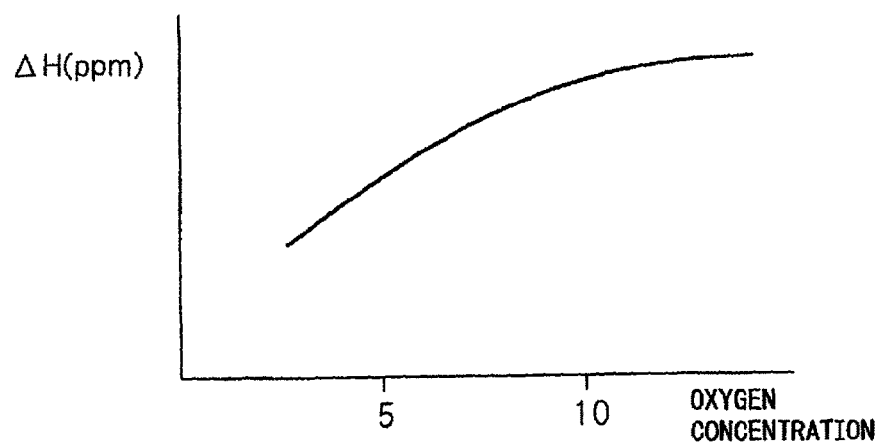
FIG. 13 is a view showing a relationship between an oxygen concentration in exhaust gas and an amplitude $\Delta H$ of a hydrocarbon concentration giving the same $NO_x$ purification rate.

FIG. 13 shows the relationship between the oxygen concentration in the exhaust gas before the hydrocarbons are fed and the amplitude ΔH of the hydrocarbon concentration when the same $NO_x$ purification rate is obtained. To obtain the same $NO_x$ purification rate, from FIG. 13, it is learned that the higher the oxygen concentration in the exhaust gas before the hydrocarbons are fed, the greater the amplitude ΔH of the hydrocarbon concentration has to be made. That is, to obtain the same $NO_x$ purification rate, the higher the base air-fuel ratio (A/F)b, the greater the amplitude ΔT of the hydrocarbon concentration has to be made. In other words, to remove the $NO_x$ well, the lower the base air-fuel ratio (A/F)b, the more the amplitude ΔT of the hydrocarbon concentration can be reduced.

Figure 14:
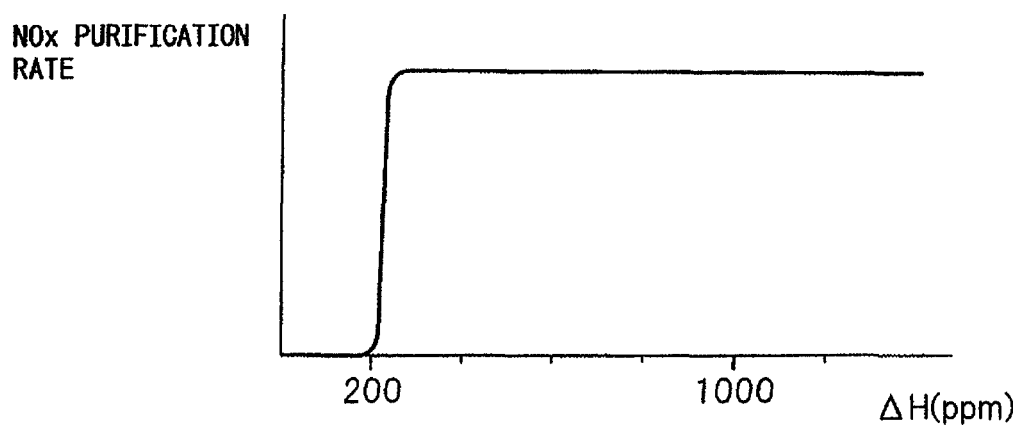
FIG. 14 is a view showing a relationship between an amplitude $\Delta H$ of a hydrocarbon concentration and an $NO_x$ purification rate.

In this regard, the base air-fuel ratio (A/F)b becomes the lowest at the time of an acceleration operation. At this time, if the amplitude ΔH of the hydrocarbon concentration is about 200 ppm, it is possible to remove the NO well. The base air-fuel ratio (A/F)b is normally larger than the time of acceleration operation. Therefore, as shown in FIG. 14, if the amplitude ΔH of the hydrocarbon concentration is 200 ppm or more, an excellent NO purification rate can be obtained.

On the other hand, it is learned that when the base air-fuel ratio (A/F)b is the highest, if making the amplitude ΔH of the hydrocarbon concentration 10000 ppm or so, an excellent $NO_x$ purification rate is obtained. Further, if the amplitude ΔH of the hydrocarbon concentration is over 10000 ppm, there is the danger that the air-fuel ratio (A/F)in will become rich. Therefore, there is the danger that the new $NO_x$ purification method which is shown from FIG. 4 to FIGS. 6A and 6B can no longer be performed. Therefore, in the present invention, the predetermined range of the amplitude of the hydrocarbon concentration is made 200 ppm to 10000 ppm.

Figure 15:
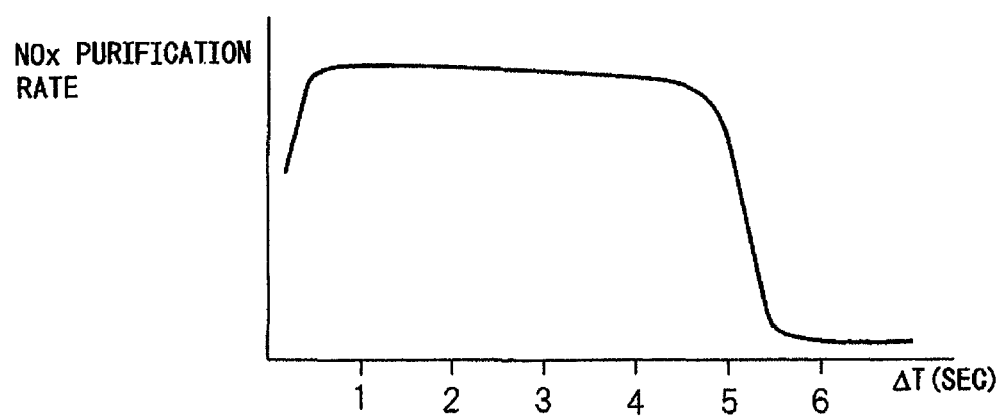
FIG. 15 is a view showing a relationship of a vibration period $\Delta T$ of a hydrocarbon concentration and an $NO_x$ purification rate.

Further, if the vibration period ΔT of the hydrocarbon concentration becomes longer, the oxygen concentration around the active $NO_2^*$ becomes higher in the time after the hydrocarbons are fed to when the hydrocarbons are next fed. In this case, if the vibration period ΔT of the hydrocarbon concentration becomes longer than about 5 seconds, the active $NO_2^*$ starts to be absorbed in the form of nitrates inside the basic layer 53. Therefore, as shown in FIG. 15, if the vibration period ΔT of the hydrocarbon concentration becomes longer than about 5 seconds, the $NO_x$ purification rate falls. Therefore, the vibration period ΔT of the hydrocarbon concentration has to be made 5 seconds or less.

On the other hand, if the vibration period ΔT of the hydrocarbon concentration becomes about 0.3 second or less, the fed hydrocarbons start to build up on the exhaust gas flow surface of the exhaust purification catalyst 13, therefore, as shown in FIG. 15, if the vibration period ΔT of the hydrocarbon concentration becomes about 0.3 second or less, the $NO_x$ purification rate falls. Therefore, in the present invention, the vibration period of the hydrocarbon concentration is made from 0.3 second to 5 seconds.

Figure 16:
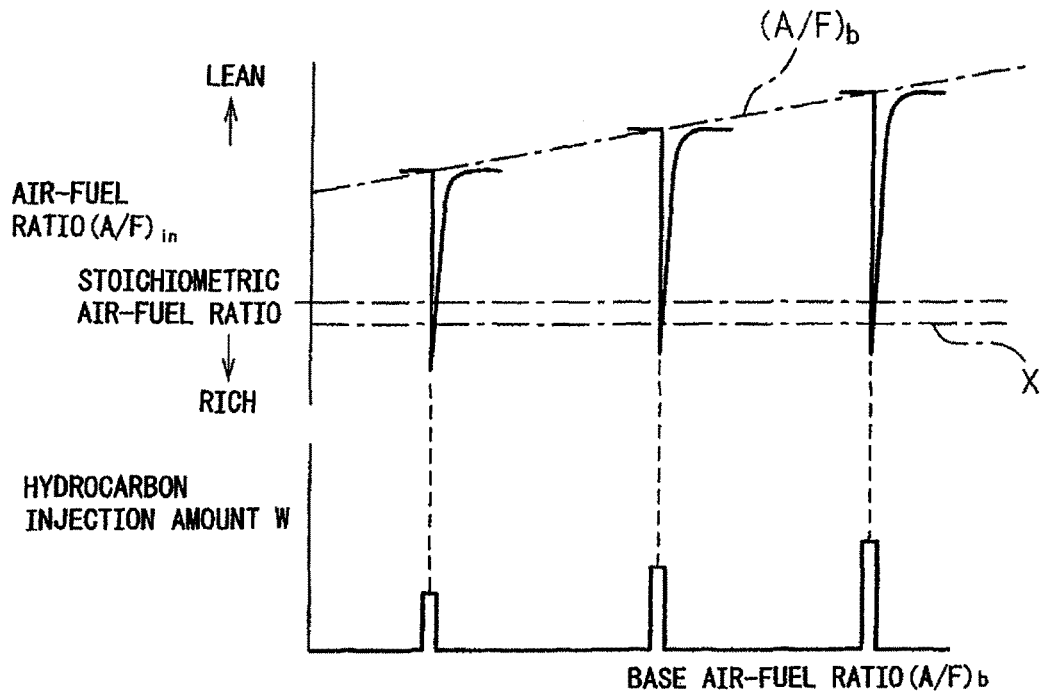
FIG. 16 is a time chart showing changes in an air-fuel ratio of exhaust gas flowing into an exhaust purification catalyst etc.
Figure 17:
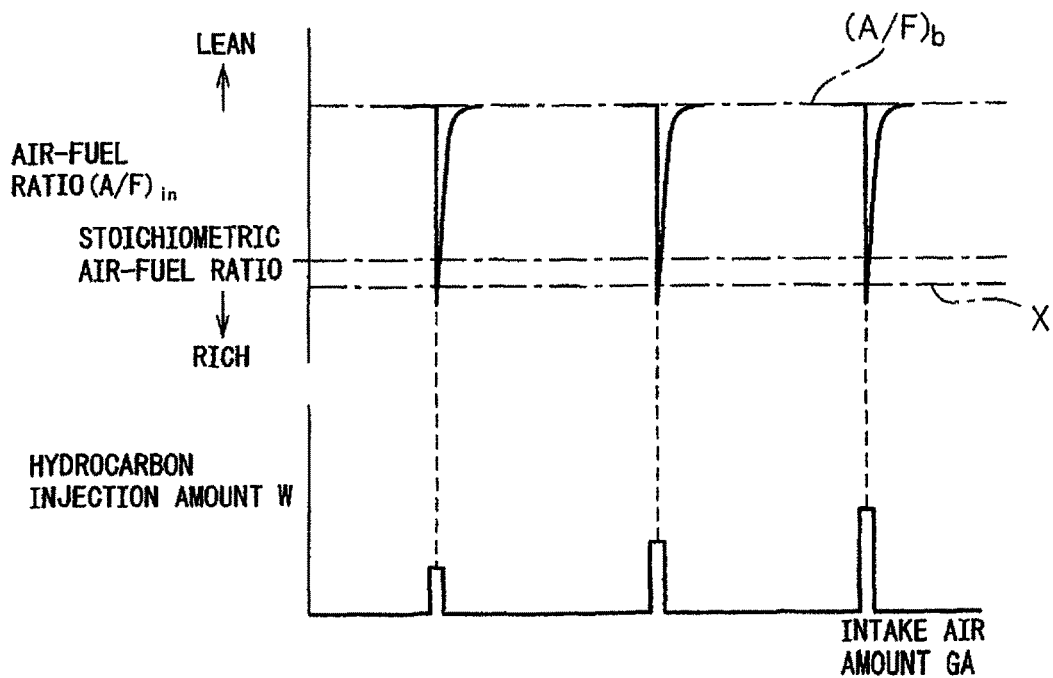
FIG. 17 is a time chart showing changes in an air-fuel ratio of exhaust gas flowing into an exhaust purification catalyst etc.

Now, in an embodiment of the present invention, by changing the injection amount and injection timing of hydrocarbons from the hydrocarbon feed valve 15, the amplitude ΔH and the vibration period ΔT of the hydrocarbon concentration are controlled to the optimum values in accordance with the operating state of the engine. FIG. 16 and FIG. 17 show the change in the optimum hydrocarbon concentration in accordance with the operating state of the engine and the injection amount W of hydrocarbons from the hydrocarbon feed valve 15 causing these changes. Note that, FIG. 16 shows the case where the base air-fuel ratio (A/F)b changes, while FIG. 17 shows the case where the intake air amount GA, that is, the exhaust gas amount, changes.

As explained above, to remove the $NO_x$ well, as the base air-fuel ratio (A/F)b such as shown in FIG. 16 becomes higher, the amplitude of the hydrocarbon concentration has to be made larger. To increase the amplitude of the hydrocarbon concentration, it is necessary to increase the injection amount W of hydrocarbons. Therefore, in an embodiment of the present invention, the higher the base air-fuel ratio (A/F)b, the greater the injection amount W of hydrocarbons is made.

On the other hand, when a certain amount of hydrocarbons is fed under a constant base air-fuel ratio (A/F)b, if the intake air amount GA increases, that is, if the exhaust gas amount increases, the hydrocarbon concentration in the exhaust gas falls. In this case, to maintain the hydrocarbon concentration in the exhaust gas at a constant concentration regardless of the intake air amount GA, it is necessary to increase the feed amount of hydrocarbons as the intake air amount GA increases. Therefore, in an embodiment of the present invention, as shown in FIG. 17, the greater the intake air amount GA, the greater the injection amount W of hydrocarbons is made.

In this way, the injection amount W of hydrocarbons which can give the optimum change in concentration of hydrocarbons in accordance with the operating state of the engine changes in accordance with the operating state of the engine. In an embodiment of the present invention, this injection amount W of hydrocarbons is stored as a function of the demanded torque TQ of the engine and engine speed N in the form of a map as shown in FIG. 18A in advance in the ROM 32.

Figure 18A:
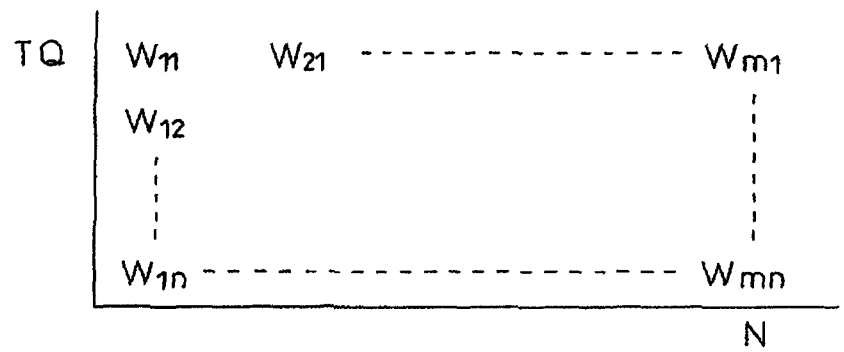
FIG. 18A, 18B, and 18C are views showing maps of a hydrocarbon feed amount W, a feed period $\Delta T$ of hydrocarbons, and a base air-fuel ratio (A/F)b.
Figure 18B:
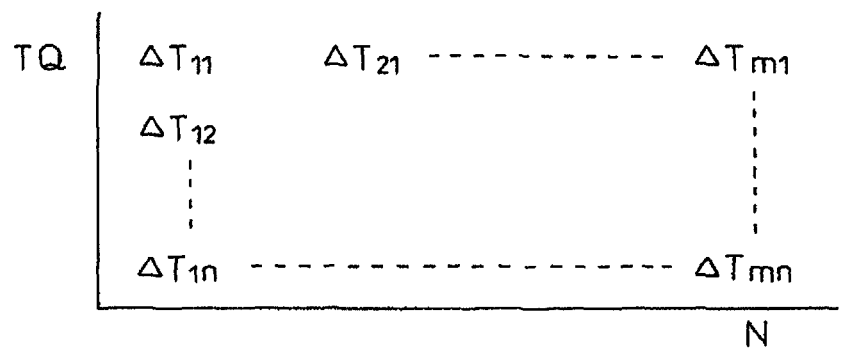
Figure 18C:
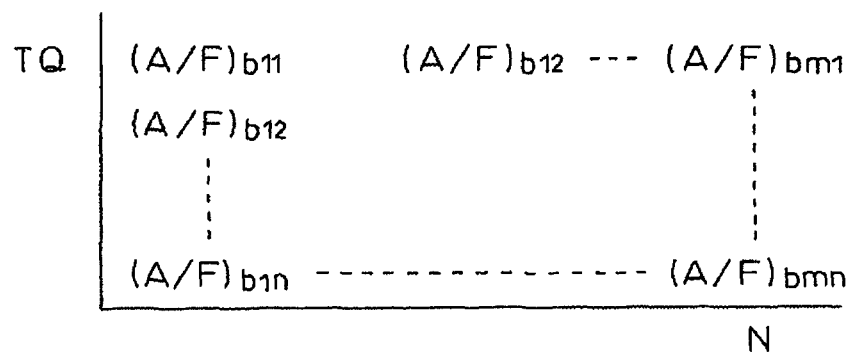

Further, the optimum vibration amplitude ΔT of the hydrocarbon concentration, that is, the injection period ΔT of the hydrocarbons, is also stored as a function of the demanded torque TQ of the engine and engine speed N in the form of a map as shown in FIG. 18B in advance in the ROM 32. Furthermore, the targeted base air-fuel ratio (A/F)b is also stored as a function of the demanded torque TQ of the engine and engine speed N in the form of a map as shown in FIG. 18C in advance in the ROM 32.

Now, when everything is operating normally, that is, when the concentration of hydrocarbons flowing into the exhaust purification catalyst 13 becomes a predetermined optimum concentration and the exhaust purification catalyst 13 is engaged in a normal purification action, if making the injection amount W of hydrocarbons the injection which is found from the map shown in FIG. 18A and making the injection period $\Delta T$ of the hydrocarbons the injection period which is found from FIG. 18B, an excellent purification action of $NO_x$ is obtained.

However, when due to some sort of reason, the concentration of hydrocarbons flowing into the exhaust purification catalyst 13 fails to become the predetermined optimum concentration or the exhaust purification catalyst 13 deteriorates, even if making the injection amount W of hydrocarbons the injection amount which is found from the map shown in FIG. 18A and making the injection period $\Delta T$ of the hydrocarbons the injection period which is found from FIG. 18B, it no longer becomes possible to remove the $NO_x$ efficiently. In this case, to remove the $NO_x$ efficiently, it is necessary to change one or both of the injection amount W of hydrocarbons and the injection period $\Delta T$ of the hydrocarbons to a value different from the value shown in FIG. 18A or FIG. 18B in accordance with the concentration of hydrocarbons or the state of exhaust purification catalyst 13.

Therefore, in the present invention, one or both of the injection amount W of hydrocarbons and the injection period $\Delta T$ of the hydrocarbons is changed in accordance with the concentration of hydrocarbons or state of exhaust purification catalyst 13. That is, expressed generally, in the present invention, at least one of the amplitude of the hydrocarbon concentration and the vibration period of the hydrocarbon concentration is changed in accordance with the concentration of hydrocarbons or state of exhaust purification catalyst 13. Next, this will be explained with reference to FIG. 19 to FIG. 36.

Figure 19:
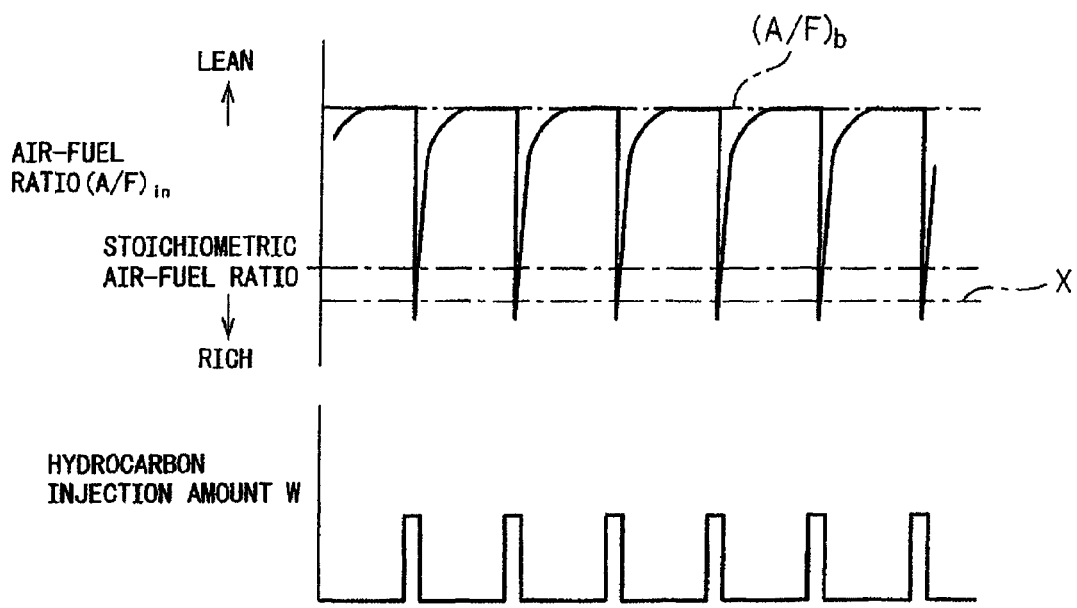
FIG. 19 is a time chart showing changes in an air-fuel ratio of exhaust gas flowing into an exhaust purification catalyst etc.

FIG. 19 shows the change in concentration of hydrocarbons flowing to the exhaust purification catalyst 13 in a certain representative engine operating state when everything is normally operating, that is, the change in the air-fuel ratio (A/F)in of the exhaust gas flowing to the exhaust purification catalyst 13, and the injection amount W of hydrocarbons. Note that, below, this representative engine operating state will be used as an example to explain the amplitude of the hydrocarbon concentration and the vibration period of the hydrocarbon concentration changed in accordance with the concentration of hydrocarbons or the state of the exhaust purification catalyst 13.

Now, in an embodiment of the present invention, the feed amount of hydrocarbons per injection is controlled to control the amplitude of the hydrocarbon concentration. Therefore, in an embodiment of the present invention, at least one of the feed amount of hydrocarbons per injection and the feed period of the hydrocarbon is changed in accordance with the concentration of hydrocarbons or state of exhaust purification catalyst 13. For example, if the oxidation ability of the exhaust purification catalyst 13 falls, the amount of hydrocarbons which can be modified per injection is reduced. At this time, if not reducing the amount of injection per injection, the amount of hydrocarbons consumed without contributing to purification of $NO_x$ ends up increasing.

Figure 20:
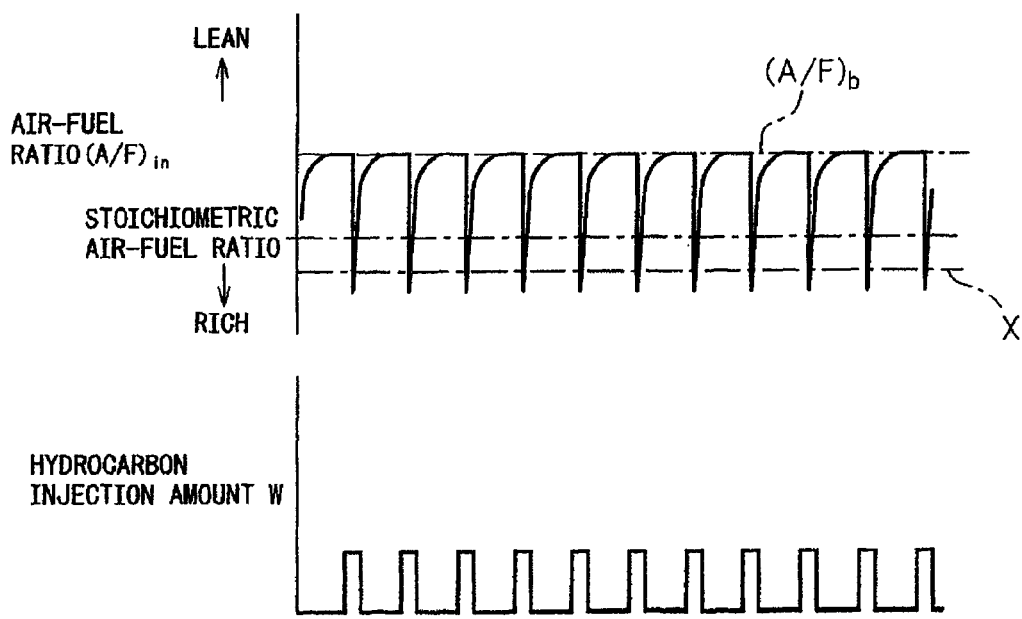
FIG. 20 is a time chart showing changes in an air-fuel ratio of exhaust gas flowing into an exhaust purification catalyst etc.

Therefore, in an embodiment of the present invention, as shown in FIG. 20, when the oxidation ability of the exhaust purification catalyst 13 falls, the feed amount of hydrocarbons per injection is reduced. Further, in an embodiment of the present invention, to prevent the total amount of hydrocarbons which is fed even if the feed amount of hydrocarbons per injection is decreased from being reduced, as shown in FIG. 20, the feed period of hydrocarbons is shortened when the oxidation ability of the exhaust purification catalyst 13 falls. Note that, at this time, when, like when the air-fuel ratio (A/F)in becomes the demanded minimum air-fuel ratio X or less, as shown in FIG. 20, the oxidation ability of the exhaust purification catalyst 13 falls, the base air-fuel ratio (A/F)b is made smaller.

In this regard, if the precious metal 51 carried on the exhaust purification catalyst 13 deteriorates, the oxidation ability of the exhaust purification catalyst 13 falls. However, even if the precious metal 51 carried on the exhaust purification catalyst 13 does not deteriorate, when the precious metal 51 is not activated, that is, when the temperature of the exhaust purification catalyst 13 is lower than the activation temperature, the oxidation ability of the exhaust purification catalyst 13 falls. Therefore, in an embodiment of the present invention, when the temperature of the exhaust purification catalyst 13 is lower than the activation temperature, it is judged that the oxidation ability of the exhaust purification catalyst 13 has fallen.

Figure 21:
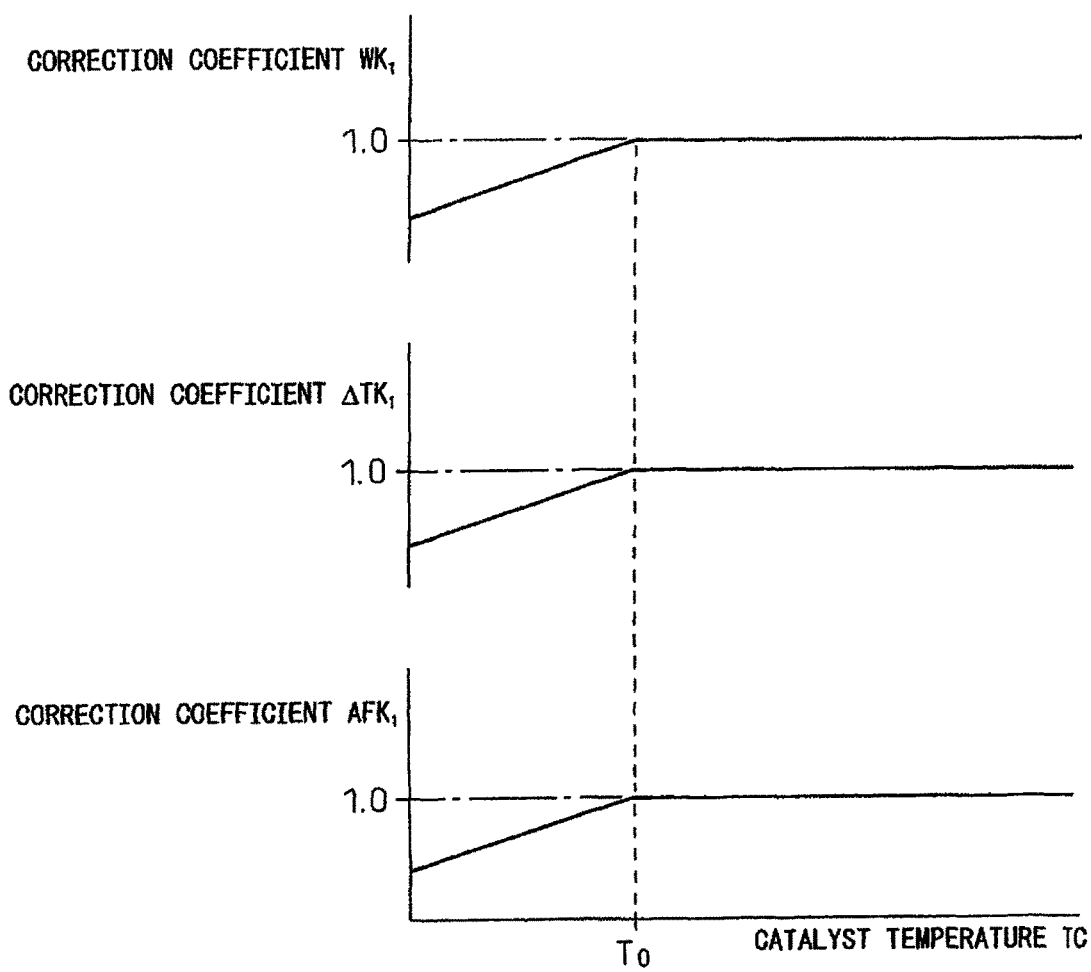
FIG. 21 is a view showing a relationship between values of correction coefficients $WK_1$, $\Delta TK_1$, and $AFK_1$ and a catalyst temperature TC.

FIG. 21 shows the relationship between the correction coefficient $WK_1$ for the injection amount W of hydrocarbons and the catalyst temperature TC of the exhaust purification catalyst 13, the relationship between the correction coefficient $\Delta TK_1$ for the injection period $\Delta T$ of the hydrocarbons and the catalyst temperature TC, and the relationship between the correction coefficient $AFK_1$ for the base air-fuel ratio (A/F)b and the catalyst temperature TC. As will be understood from FIG. 21, the values of the correction coefficients $WK_1$, $\Delta TK_1$, and $\Delta FK_1$ are made 1.0 when the catalyst temperature TC is higher than the activation temperature $T_0$ and gradually fall when the catalyst temperature TC becomes less than the activation temperature $T_0$. Therefore, if the catalyst temperature TC becomes the activation temperature $T_0$ or less, the injection amount W of hydrocarbons per injection is reduced, the injection period $\Delta T$ of the hydrocarbons is made shorter, and the base air-fuel ratio (A/F)b is reduced.

Figure 22:
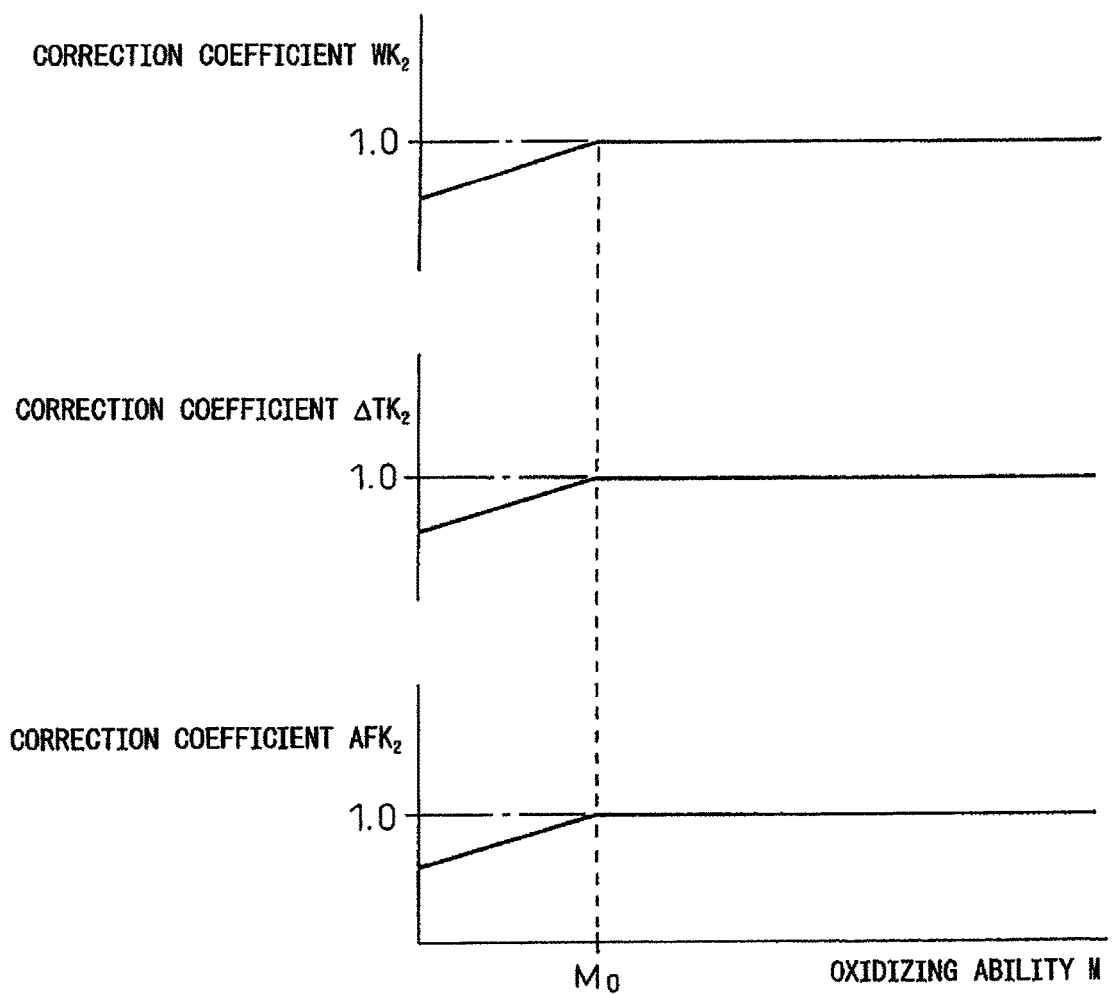
FIG. 22 is a view showing a relationship between values of correction coefficients $WK_2$, $\Delta TK_2$, and $AFK_2$ and an oxidation ability M.

On the other hand, FIG. 22 shows the relationship between the correction coefficient $WK_2$ for the injection amount W of hydrocarbons and the oxidation ability M of the exhaust purification catalyst 13, the relationship of the correction coefficient $\Delta TK_2$ for the injection period $\Delta T$ of the hydrocarbons and the oxidation ability M, and the relationship between the correction coefficient $\Delta FK_2$ for the base air-fuel ratio (A/F)b and the oxidation ability M in the case where the oxidation ability M of the exhaust purification catalyst 13 changes due to the deterioration of the precious metal 51. As will be understood from FIG. 22, the values of the correction coefficient $WK_2$, $\Delta TK_2$, and $\Delta FK_2$ are made 1.0 when the oxidation ability M is a reference value $M_0$ or more and are gradually reduced when the oxidation ability M becomes the reference value $M_0$ or less, that is, when the precious metal 51 carried on the exhaust purification catalyst 13 deteriorates. From FIG. 22, it is understood that if the oxidation ability M becomes the reference value $M_0$ or less, the injection amount W of hydrocarbons per injection is reduced, the injection period $\Delta T$ of the hydrocarbons is shortened, and the base air-fuel ratio (A/F)b is reduced.

Figure 23:
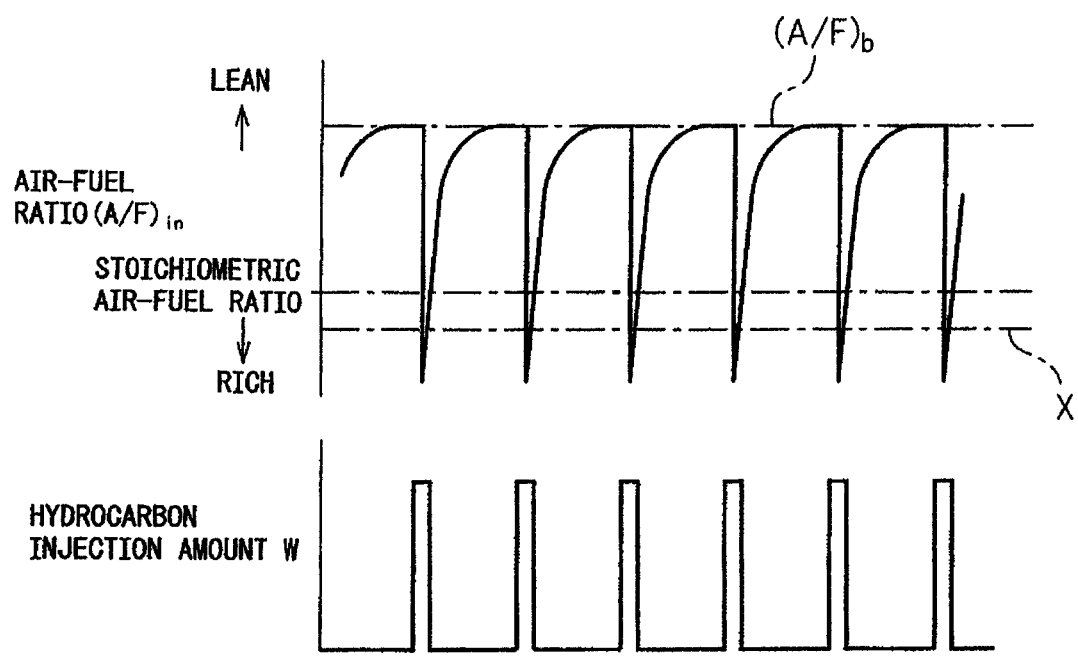
FIG. 23 is a time chart showing changes in an air-fuel ratio of exhaust gas flowing into an exhaust purification catalyst etc.

On the other hand, if the amount of hydrocarbons becomes insufficient compared with the amount required for reduction of $NO_x$ when reducing $NO_x$ in the exhaust purification catalyst 13, the purification rate of $NO_x$ falls. Therefore, when there is not enough of the amount of hydrocarbons as required for reduction of $NO_x$ in the exhaust purification catalyst 13, as shown in FIG. 23, the feed amount of hydrocarbons per injection is increased.

In this way, an insufficient state of the amount of hydrocarbons required for reduction of $NO_x$ in the exhaust purification catalyst 13 occurs in response to various circumstances. The representative state is when the amount of sulfur poisoning at the upstream side end of the exhaust purification catalyst 13 increases. That is, exhaust gas contains $SO_x$. This $SO_x$ is sometimes stored in the form of sulfates in the basic layer 43 when flowing into the exhaust purification catalyst 13. The storage action of this $SO_x$ first occurs at the upstream side end of the exhaust purification catalyst 13. Therefore, as time elapses, the amount of sulfates which is stored in the basic layer 53 at the upstream end of the exhaust purification catalyst 13 gradually increases.

If the amount of the stored sulfates increases, the basicity of the basic layer 53 becomes weaker. As a result, the oxidation ability of the precious metal 51 at the upstream side end of the exhaust purification catalyst 13 increases and the main location where the reducing action of $NO_x$ is performed shifts to the downstream side. However, if the oxidation ability of the precious metal 51 at the upstream side end of exhaust purification catalyst 13 increases in this way, a large amount of hydrocarbons ends up being oxidized at the upstream side end of exhaust purification catalyst 13, that is, ends up being consumed. As a result, the amount of hydrocarbons at the main location where the reducing action of the $NO_x$ is performed, that is, at the downstream side of the exhaust purification catalyst 13, ends up becoming insufficient compared with the amount necessary for reduction of the $NO_x$.

Figure 24:
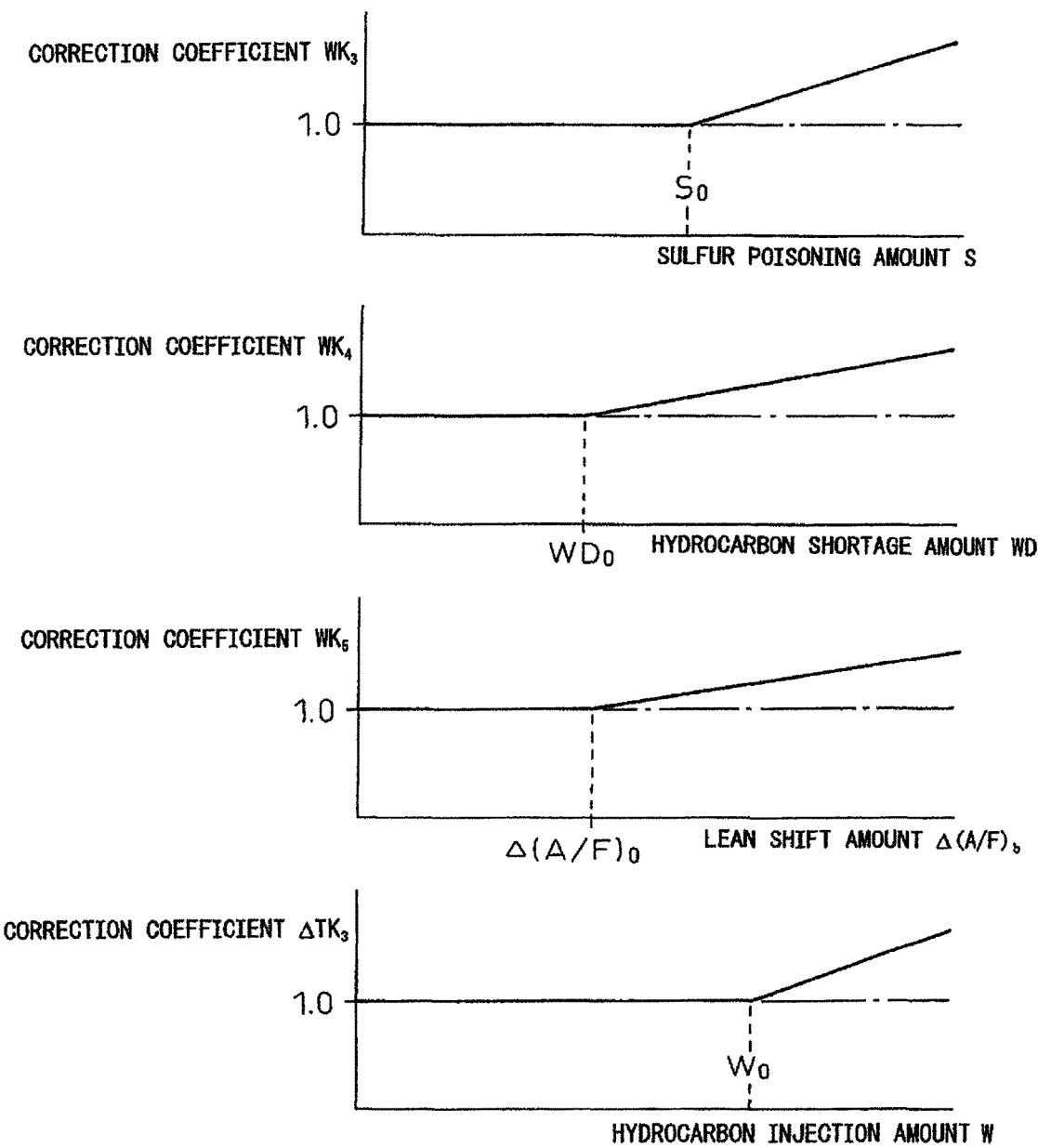
FIG. 24 is a view showing a relationship between a value of a correction coefficient $WK_3$ and a sulfur poisoning amount S.

Therefore, in an embodiment of the present invention, when the $SO_x$ storage amount, that is, the sulfur poisoning amount, of the upstream side end of the exhaust purification catalyst 13 becomes larger than a predetermined reference poisoning amount, it is judged that there is not enough of an amount of hydrocarbons as required for reduction of the $NO_x$ at the exhaust purification catalyst 13. At this time, in an embodiment of the present invention, the feed amount of hydrocarbons per injection is increased to make up for the shortage of hydrocarbons. For this reason, in an embodiment of the present invention, as shown in FIG. 24, when the sulfur poisoning amount S exceeds the reference poisoning amount $S_0$, the value of the correction coefficient $WK_3$ for the injection amount W of hydrocarbons is increased.

As another situation at which there is not enough of an amount of hydrocarbons as required for reduction of $NO_x$ at the exhaust purification catalyst 13, for example, the case where the nozzle port of the hydrocarbon feed valve 15 becomes clogged, so the amount of injection of hydrocarbons is reduced may be mentioned. If the amount of injection of hydrocarbons is reduced in this way, the purification rate of $NO_x$ falls. Therefore, in an embodiment of the present invention, at this time, the amount of injection of hydrocarbons per injection is increased so that an excellent $NO_x$ purification rate is obtained. That is, in an embodiment of the present invention, as shown in FIG. 24, when the hydrocarbon shortage amount WD from the amount of hydrocarbons required for reduction of $NO_x$ exceeds the reference amount $WD_0$, the value of the correction coefficient $WK_4$ for the injection amount W of hydrocarbons is increased.

As still another situation where there are not enough hydrocarbons as required for reduction of $NO_x$ at the exhaust purification catalyst 13, the case where the base air-fuel ratio (A/F)b has shifted to the lean side may be mentioned. If the base air-fuel ratio (A/F)b shifts to the lean side in this way, the purification rate of $NO_x$ falls. Therefore, in an embodiment of the present invention, when the base air-fuel ratio (A/F)b shifts by a predetermined amount or more to the lean side, the amount of hydrocarbons per injection is increased so that an excellent $NO_x$ purification rate is obtained. That is, in an embodiment of the present invention, as shown in FIG. 24, when the shift Δ(A/F)b to the lean side of the base air-fuel ratio (A/F)b exceeds a reference value $\Delta(A/F)_0$, the value of the correction coefficient $WK_5$ for the injection amount W of hydrocarbons is increased.

On the other hand, if the injection amount W of hydrocarbons per injection exceeds a certain limit, there is a danger of the injected hydrocarbons building up on the exhaust purification catalyst 13. Therefore, in an embodiment of the present invention, when the injection amount W of hydrocarbons per injection becomes a predetermined reference amount $W_0$ or more, the injection period of hydrocarbons is made longer. That is, in an embodiment of the present invention, as shown in FIG. 24, when the injection amount W of hydrocarbons exceeds a reference amount $W_0$, the value of the correction coefficient $\Delta TK_3$ for the injection period ΔT of the hydrocarbons is made larger.

Figure 25:
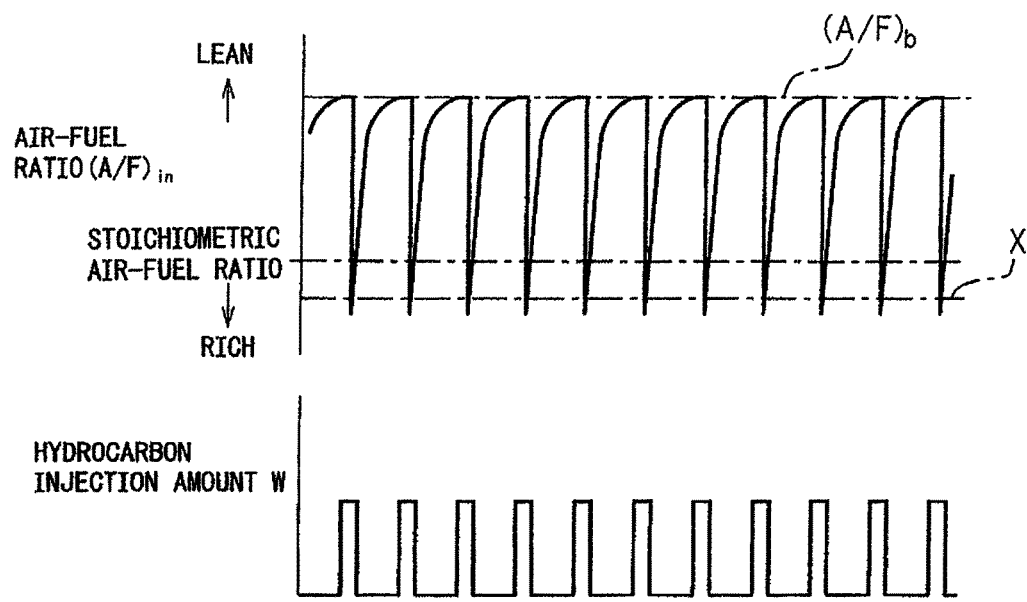
FIG. 25 is a time chart showing changes in an air-fuel ratio of exhaust gas flowing into an exhaust purification catalyst etc.
Figure 26:
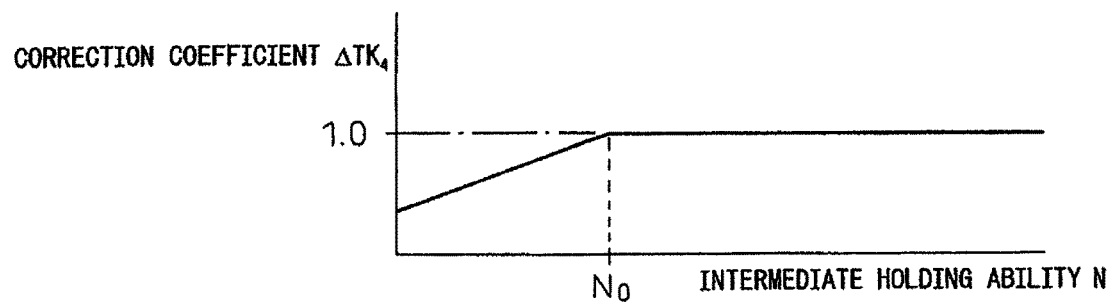
FIG. 26 is a view showing a relationship between a value of a correction coefficient $\Delta TK_4$ and an intermediate holding ability N.

On the other hand, for example, if the carrier 50 of the exhaust purification catalyst 13 deteriorates and the surface area of the carrier 50 becomes smaller, the holding ability of the reducing intermediate which is produced inside of the exhaust purification catalyst 13 falls. If the holding ability of the reducing intermediate falls, the amount of the reducing intermediate which is held on the basic layer 53 is reduced and consequently the purification rate of $NO_x$ falls. In this case, to obtain an excellent $NO_x$ purification rate, it is necessary to increase the amount of the held reducing intermediate. For this reason, it is necessary to shorten the feed period of hydrocarbons. Therefore, in an embodiment of the present invention, when the holding ability of the reducing intermediate falls, as shown in FIG. 25, the injection period of hydrocarbons is made shorter. That is, in an embodiment of the present invention, as shown in FIG. 26, if the intermediate holding ability N becomes a predetermined reference value $N_0$ or less, the value of the correction coefficient $\Delta TK_4$ for the injection period ΔT of the hydrocarbons is reduced.

Figure 27:
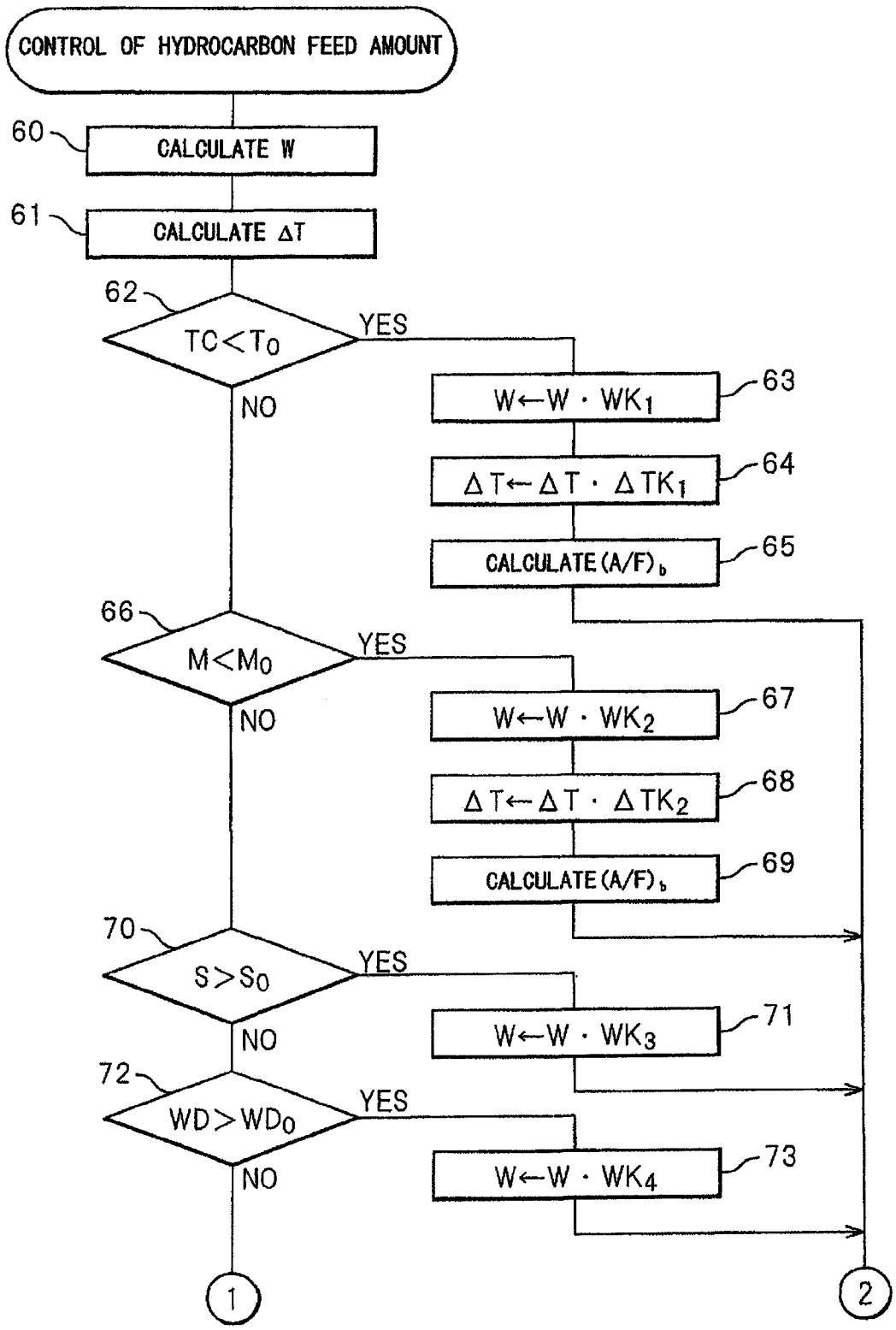
FIGS. 27 and 28 are a flow chart for control of a hydrocarbon feed amount.
Figure 28:
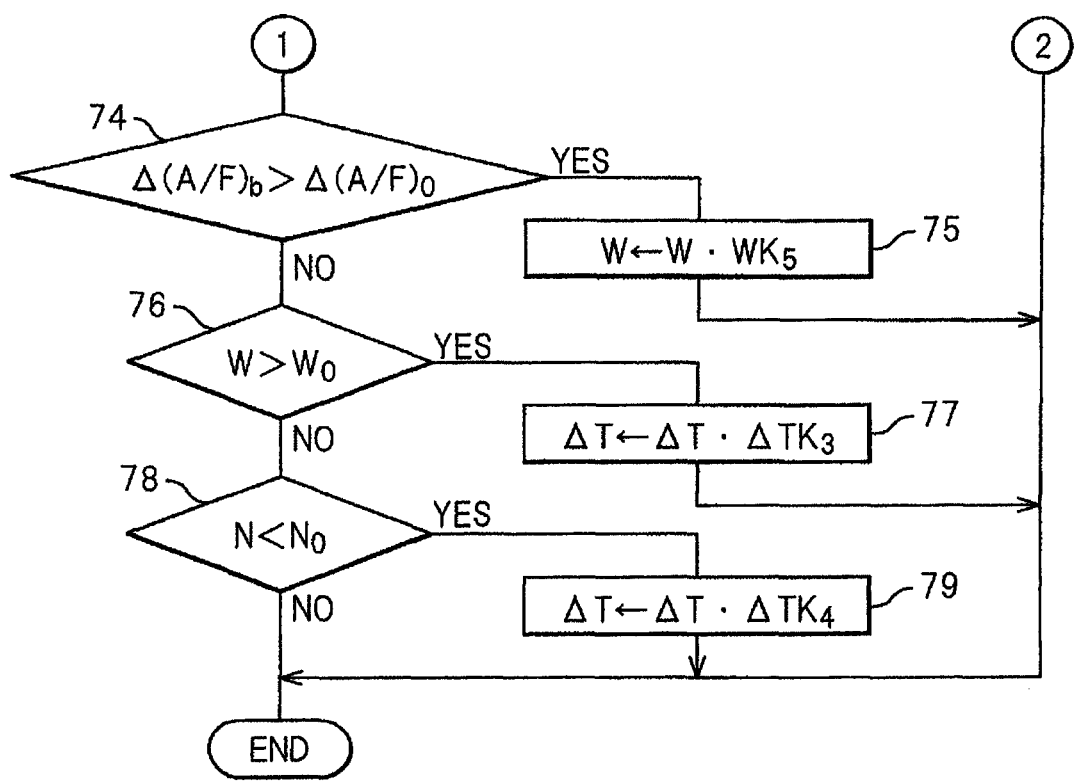

FIG. 27 and FIG. 28 show a control routine of the hydrocarbon feed amount. Note that, this control routine is executed by interruption every predetermined time interval.

Referring to FIG. 27, first, at step 60, the injection amount W of hydrocarbons is calculated from the map shown in FIG. 18A. Next, at step 61, the injection period ΔT of the hydrocarbons is calculated from the map shown in FIG. 18B. Next, at step 62, it is judged if the catalyst temperature TC of the exhaust purification catalyst 13 is lower than the activation temperature $T_o$ shown in FIG. 21. When TC<$T_0$, the routine proceeds to step 63.

At step 63, the value of the correction coefficient $WK_1$ which is found from the relationship shown in FIG. 21 is multiplied with W so as to calculate the final injection amount W of hydrocarbons. Next, at step 64, the value of the correction coefficient $\Delta TK_1$ which is found from the relationship shown in FIG. 21 is multiplied with ΔT to calculate the final injection period ΔT of the hydrocarbons. Next, at step 65, the value of the correction coefficient $\Delta FK_1$ which is found from the relationship shown in FIG. 21 is multiplied with the base air-fuel ratio (A/F)b which is found from the map of FIG. 18C or the base air-fuel ratio (A/F)b calculated from the injection amount W of hydrocarbons and the intake air amount so as to calculate the final base air-fuel ratio (A/F)b. The throttle valve 10 is used to control the intake air amount so that the base air-fuel ratio (A/F)b becomes this final base air-fuel ratio (A/F)b.

On the other hand, when, at step 62, $TC \geq T_0$, the routine proceeds to step 66 where it is judged if the oxidation ability M of the exhaust purification catalyst 13 is lower than the reference value $M_0$ shown in FIG. 22.

When $M<M_0$, the routine proceeds to step 67. At step 67, the value of the correction coefficient $WK_2$ which is found from the relationship shown in FIG. 22 is multiplied with W so as to calculate the final injection amount W of hydrocarbons. Next, at step 68, the value of the correction coefficient $\Delta TK_2$ which is found from the relationship shown in FIG. 22 is multiplied with $\Delta T$ so as to calculate the final injection period $\Delta T$ of the hydrocarbons.

Next, at step 69, the value of the correction coefficient $\Delta FK_2$ which is found from the relationship shown in FIG. 22 is multiplied with the base air-fuel ratio (A/F)b which is found from the map of FIG. 18C or the base air-fuel ratio (A/F)b calculated from the injection amount W of hydrocarbons and the intake air amount so as to calculate the final base air-fuel ratio (A/F)b. The throttle valve 10 is used to control the intake air amount so that the base air-fuel ratio (A/F)b becomes this final base air-fuel ratio (A/F)b.

On the other hand, when it is judged, at step 66, that $M \geq M_0$, the routine proceeds to step 70 where it is judged if the sulfur poisoning amount S of the exhaust purification catalyst 13 becomes larger than the reference poisoning amount $S_0$ shown in FIG. 24. When $S>S_0$, the routine proceeds to step 71 where the value of the correction coefficient $WK_3$ which is found from the relationship shown in FIG. 24 is multiplied with W so as to calculate the final injection amount W of hydrocarbons.

On the other hand, when it is judged at step 70 that $S \leq S_0$, the routine proceeds to step 72 where it is judged if the hydrocarbon shortage amount WD is greater than the reference amount $WD_0$ shown in FIG. 24. When $WD>WD_0$, the routine proceeds to step 73 where the value of the correction coefficient $WK_4$ which is found from the relationship shown in FIG. 24 is multiplied with W to calculate the final injection amount W of hydrocarbons.

On the other hand, when it is judged at step 72 that $W \leq WD_0$, the routine proceeds to step 74 where it is judged if the lean shift amount $\Delta(A/F)b$ of the base air-fuel ratio is larger than the reference value $\Delta(A/F)_0$ shown in FIG. 24. When $\Delta(A/F)b>\Delta(A/F)_0$, the routine proceeds to step 75 where the value of the correction coefficient $WK_5$ which is found from the relationship shown in FIG. 24 is multiplied with W so as to calculate the final injection amount W of hydrocarbons.

On the other hand, when it is judged at step 74 that $\Delta(A/F)b5 \leq \Delta(A/F)_0$, the routine proceeds to step 76 where it is judged that the injection amount W of hydrocarbons per injection is larger than the reference amount $W_0$ shown in FIG. 24. When $W>W_0$, the routine proceeds to step 77 where the value of the correction coefficient $\Delta TK_3$ which is found from the relationship shown in FIG. 24 is multiplied with $\Delta T$ to calculate the final injection period $\Delta T$ of the hydrocarbons.

On the other hand, when it is judged at step 76 that $W \leq W_0$, the routine proceeds to step 78 where it is judged that the intermediate holding ability N becomes lower than the reference value $N_0$ shown in FIG. 26. When $N<N_0$, the routine proceeds to step 79 where the value of the correction coefficient $\Delta TK_4$ which is found from the relationship shown in FIG. 26 is multiplied with $\Delta T$ to calculate the final injection period $\Delta T$ of the hydrocarbons.

Figure 29A:
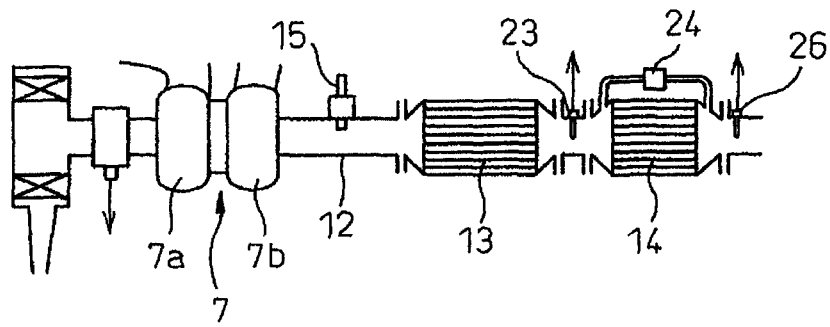
FIGS. 29A, 29B, and 29C are views for explaining a method of judgment of oxidation ability etc.
Figure 29B:
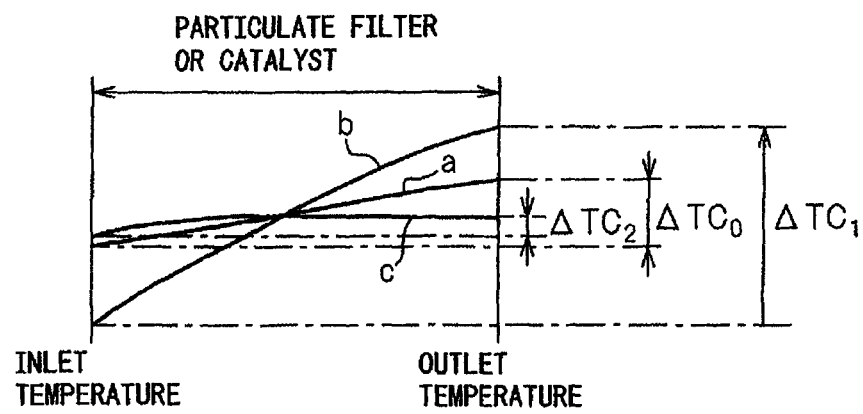
Figure 29C:
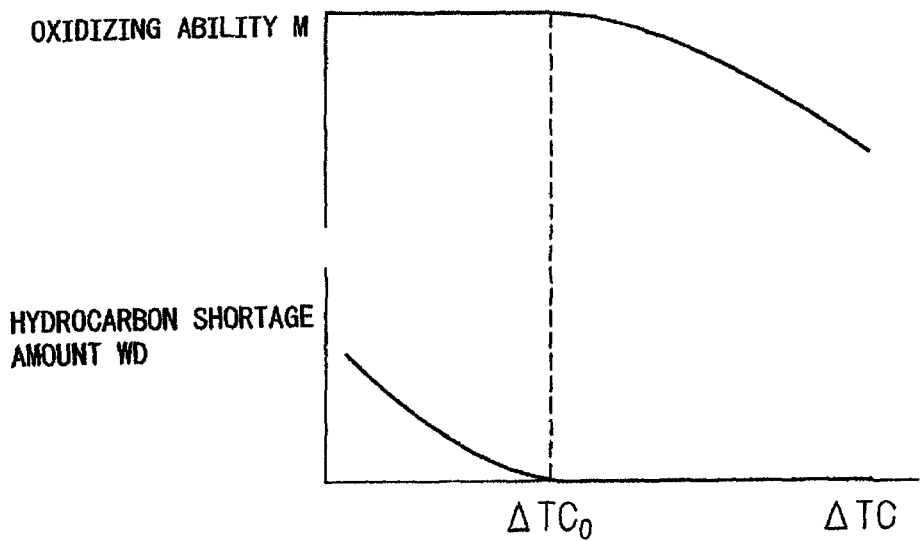

FIG. 29A, FIG. 29B, and FIG. 29C show an embodiment of the judging means for judging the oxidation ability of the exhaust purification catalyst 13 and the hydrocarbon shortage amount in the exhaust purification catalyst 13. In this embodiment, as shown in FIG. 29A, in addition to the temperature sensor 23 which is arranged at the inlet of the particulate filter 14, a temperature sensor 26 is arranged at the outlet of the particulate filter 14. Further, on the particulate filter 14, platinum is carried. Therefore, the particulate filter 14 has an oxidation function. Note that, instead of this particulate filter 14, it is also possible to use a catalyst which has an oxidation function. That is, in this embodiment, inside of the engine exhaust passage downstream of the exhaust purification catalyst 13, a catalyst having an oxidation function or the particulate filter 14 is arranged.

FIG. 29B shows the temperature change in the particulate filter 14 or, in the case where a catalyst having an oxidation function is used instead of the particulate filter 14, the temperature change in the catalyst. Even when the exhaust purification catalyst 13 is operating normally, part of the hydrocarbons passes straight through the exhaust purification catalyst 13, so hydrocarbons flow into the particulate filter or catalyst 14. The hydrocarbons are oxidized inside of the particulate filter or catalyst 14, so the heat of oxidation reaction of the hydrocarbons causes the temperature of the particulate filter or catalyst 14 to gradually rise from the inlet to the output of the particulate filter or catalyst 14.

In FIG. 29B, the solid line "a" shows the temperature change inside of the particulate filter or catalyst 14 when the exhaust purification catalyst 13 is operating normally. At this time, the temperature difference between the inlet temperature and the outlet temperature is shown by $\Delta TC_0$. On the other hand, if the oxidation ability of the exhaust purification catalyst 13 falls, the amount of hydrocarbons which is oxidized in the exhaust purification catalyst 13 falls, so the amount of hydrocarbons which flow into the particulate filter or catalyst 14 increases. Therefore, at this time, as shown by the FIG. 29B, as shown by the solid line "b", the temperature gradient becomes larger. At this time, the temperature difference between the inlet temperature and the outlet temperature, that is, the rise of the exhaust gas temperature in the time from when the exhaust gas flows in to the particulate filter or catalyst 14 to when it flows out is shown by $\Delta TC_1$.

In an embodiment of the present invention, as shown in FIG. 29C, when the rise $\Delta TC$ of the exhaust gas temperature in the time from when the exhaust gas flows into the particulate filter or catalyst 14 to when it flows out is larger than the predetermined reference rise $\Delta TC_0$ it is judged that the oxidation ability M of the exhaust purification catalyst 13 has fallen.

As opposed to this, if the amount of hydrocarbons which is fed to the exhaust purification catalyst 13 becomes smaller compared with a regular amount, the amount of hydrocarbons which flows into the particulate filter or catalyst 14 becomes smaller. Therefore, at this time, as shown by the solid line "c" in FIG. 29B, the temperature gradient becomes smaller. At this time, the temperature difference between the inlet temperature and the outlet temperature, that is, the rise of the exhaust gas temperature in the time from when the exhaust gas flows into the particulate filter or catalyst 14 to when it flows out, is shown by $\Delta TC_2$.

In an embodiment of the present invention, as shown in FIG. 29C, when the rise $\Delta TC$ in the exhaust gas temperature in the time from when the exhaust gas flows into the particulate filter or catalyst 14 to when it flows out is smaller than the predetermined reference rise $\Delta TC_0$ it is judged that there is not enough of an amount of hydrocarbons as required for reduction of the $NO_x$ in the exhaust purification catalyst 13 and the hydrocarbon shortage amount DW is made a positive value.

Figure 30:
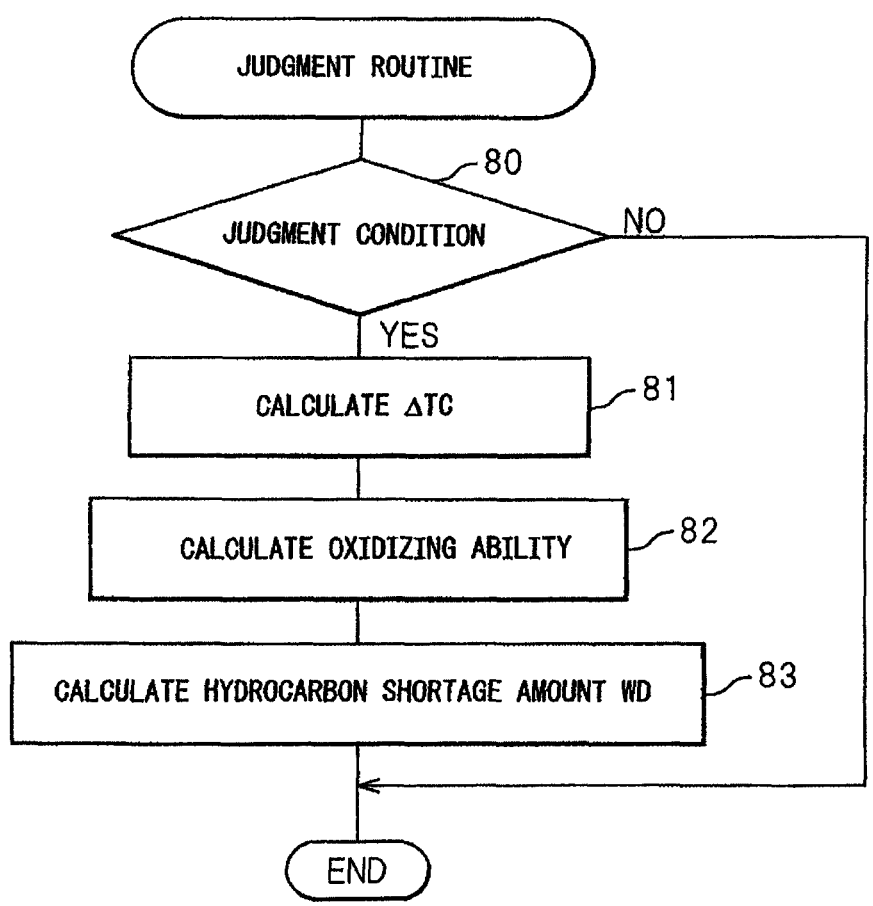
FIG. 30 is a flow chart for judgment of oxidation ability etc.
Figure 31:
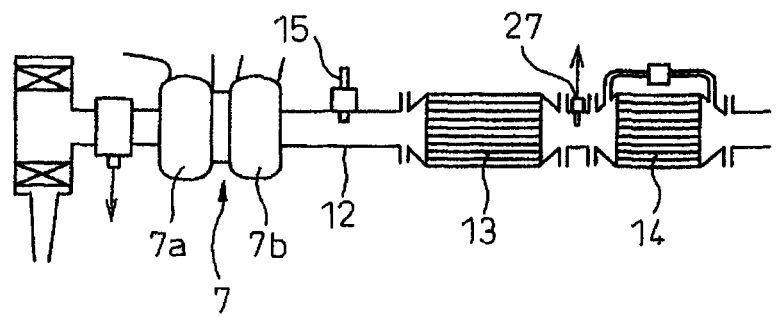
FIGS. 31A, 31B, are 31C are views for explaining another method of judgment of oxidation ability etc.
Figure 31:
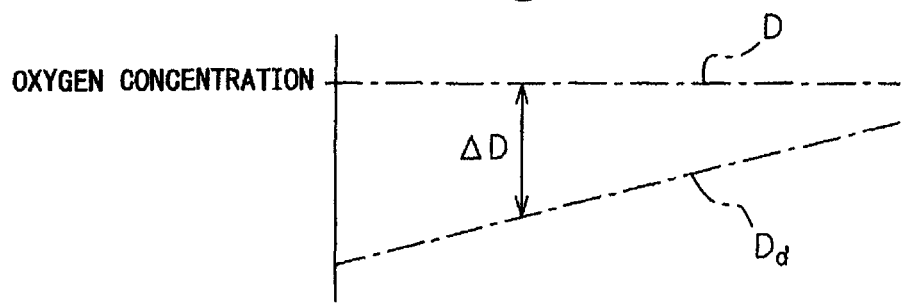
Figure 31:
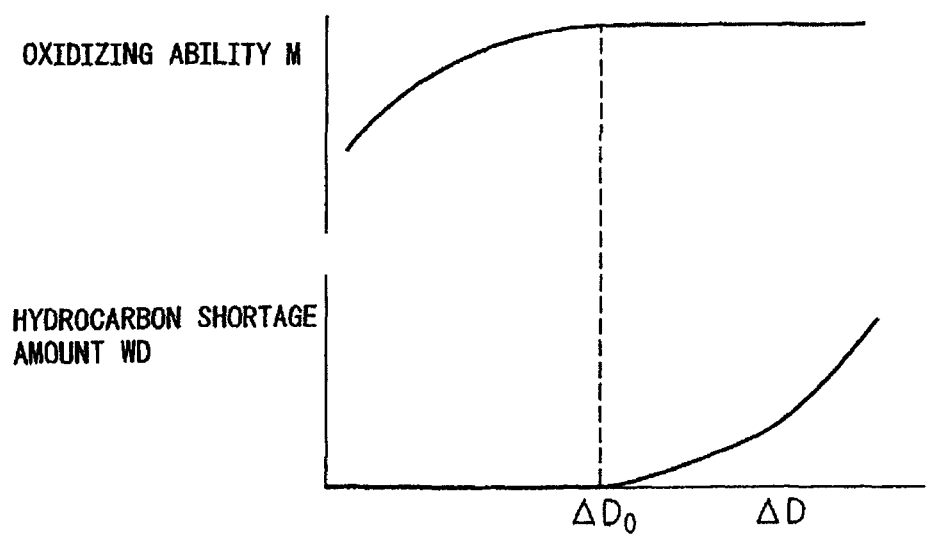

FIG. 30 shows a routine for executing the method of judgment explained based on FIG. 29A to FIG. 29C. This routine is executed by interruption every predetermined time.

Referring to FIG. 30, first, at step 80, it is judged if the operating state of the engine is a predetermined operating state suitable for judgment or not. When the operating state of the engine is the predetermined operating state suitable for judgment, the routine proceeds to step 81. At step 81, the temperature difference $\Delta TC$ between the inlet temperature and the outlet temperature of the particulate filter or catalyst 14 is calculated from the output signals of the temperature sensors 23 and 26. Next, at step 82, this temperature difference $\Delta TC$ is used as the basis to calculate the oxidation ability M from FIG. 29C. Next, at step 83, this temperature difference $\Delta TC$ is used as the basis to calculate the hydrocarbon shortage amount WD from FIG. 29C.

FIG. 31A, FIG. 31B, and FIG. 31C show another embodiment of the judging means for judging the oxidation ability of the exhaust purification catalyst 13 and the hydrocarbon shortage amount in the exhaust purification catalyst 13. In this embodiment, as shown in FIG. 31A, an oxygen concentration sensor 27 is arranged downstream of the exhaust purification catalyst 13.

When the feed amount of hydrocarbons is made a predetermined regular feed amount and the exhaust purification catalyst 13 is normal, a predetermined amount of oxygen is consumed at the exhaust purification catalyst 13 in accordance with the operating state of the engine. On the other hand, if the operating state of the engine is determined, the oxygen concentration in the exhaust gas flowing into the exhaust purification catalyst 13 is determined. Therefore, in this case, if detecting the oxygen concentration in the exhaust gas flowing out from the exhaust purification catalyst 13 by the oxygen concentration sensor 27, it is possible to find the oxygen consumption amount in the exhaust purification catalyst 13 from the detection results.

Now, if the oxidation ability of the exhaust purification catalyst 13 falls, the oxygen consumption amount at the exhaust purification catalyst 13 falls. Further, even when the amount of hydrocarbons which is fed to the exhaust purification catalyst 13 becomes insufficient compared with the regular amount, the oxygen consumption amount in the exhaust purification catalyst 13 falls. Therefore, if detecting that the oxygen consumption amount in the exhaust purification catalyst 13 has fallen, it is learned that the oxidation ability of the exhaust purification catalyst 13 has fallen or the amount of hydrocarbons which is fed to the exhaust purification catalyst 13 becomes insufficient.

Therefore, in this embodiment, first, it is judged if the oxygen consumption amount in exhaust purification catalyst 13 has been reduced from a predetermined reference consumption amount determined by the operating state of the engine, that is, the amount of consumption at the time of normal operation. At this time, when it is judged that the oxygen consumption amount at the exhaust purification catalyst 13 has been reduced from the reference consumption amount, the feed amount of hydrocarbons is increased. FIG. 31B, D, shows the oxygen concentration which is detected by the oxygen concentration sensor 27 before the feed amount of hydrocarbons is increased, while FIG. 31B, Dd, shows the oxygen concentration which is detected by the oxygen concentration sensor 27 after the feed amount of hydrocarbons is increased. Note that, FIG. 31B, $\Delta D$, shows the drop in the oxygen concentration in the exhaust gas which flows out from the exhaust purification catalyst 13 when the feed amount of hydrocarbons increases.

Now, when the oxidation ability of the exhaust purification catalyst 13 has fallen, even if increasing the feed amount of hydrocarbons, the amount of consumption by oxidation at the oxygen exhaust purification catalyst 13 does not increase that much. Therefore, the drop $\Delta D$ in the oxygen concentration becomes smaller. As opposed to this, when the amount of hydrocarbons which is fed to the exhaust purification catalyst 13 is insufficient, if increasing the feed amount of hydrocarbons, the amount of consumption by oxidation at the exhaust purification catalyst 13 increases and therefore the drop AD in the oxygen concentration becomes larger.

Therefore, in this embodiment, when the oxygen consumption amount inside of the exhaust purification catalyst 13 is smaller than a predetermined reference consumption amount, the feed amount of hydrocarbons is increased. At this time, when the drop $\Delta D$ of the oxygen concentration in the exhaust gas which flows out from the exhaust purification catalyst 13 is smaller than the predetermined reference drop $\Delta D_0$ shown in FIG. 31C, it is judged that the oxidation ability M of the exhaust purification catalyst 13 has fallen.

On the other hand, in an embodiment of the present invention, when the oxygen consumption amount inside of the exhaust purification catalyst 13 is smaller than a predetermined reference consumption amount, the feed amount of hydrocarbons is increased. At this time, when the drop $\Delta D$ of the oxygen concentration in the exhaust gas which flows out from the exhaust purification catalyst 13 is larger than the predetermined reference drop $\Delta D_0$, it is judged that the amount of hydrocarbons which is required for reduction of the $NO_x$ in the exhaust purification catalyst 13 is insufficient and the hydrocarbon shortage amount WD is made a positive value.

Figure 32:
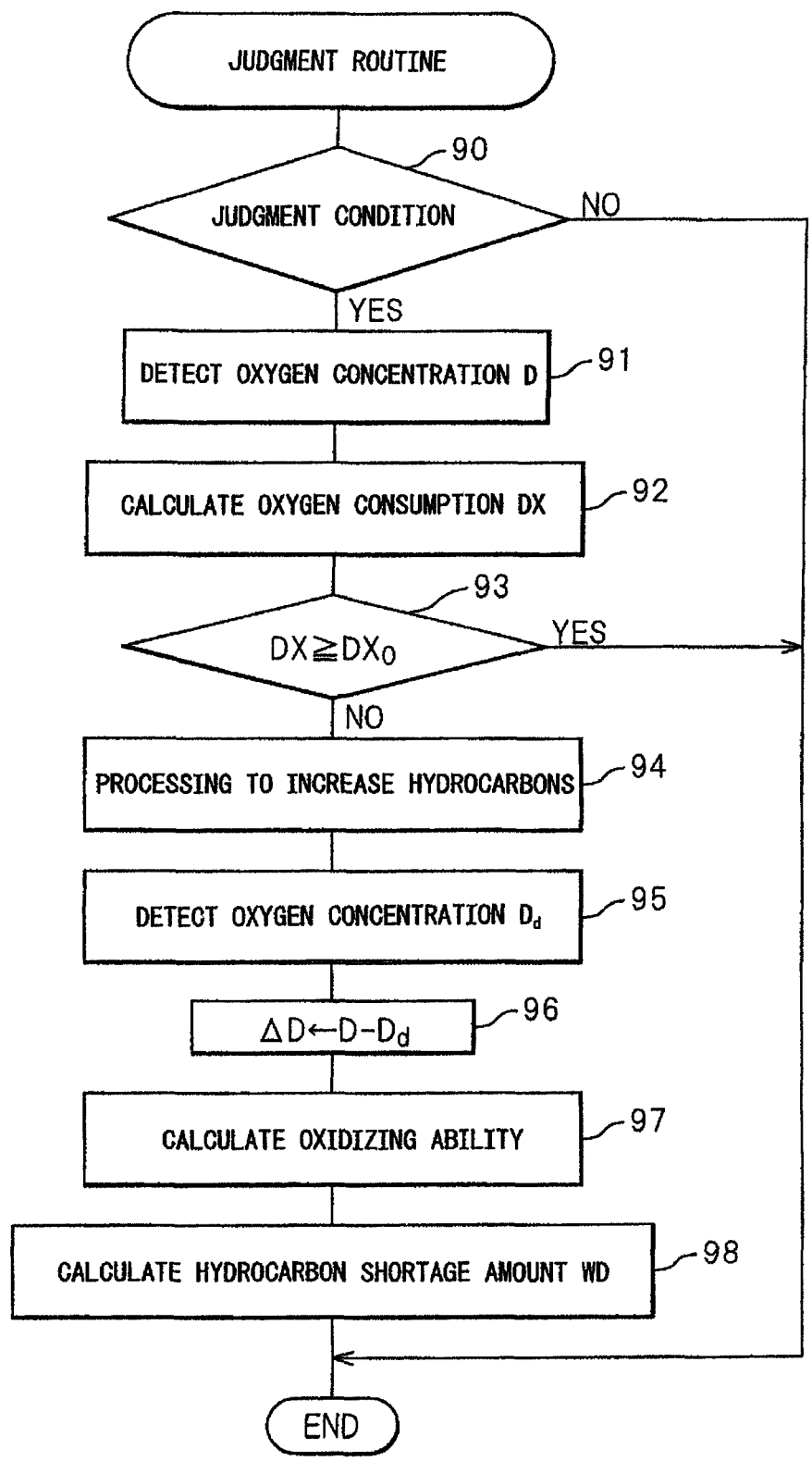
FIG. 32 is a flow chart for judgment of oxidation ability etc.

FIG. 32 shows the routine for working the method of judgment explained based on FIG. 31A to FIG. 31C. This routine is executed by interruption every predetermined time interval.

Referring to FIG. 32, first, at step 90, it is judged if the operating state of the engine is a predetermined operating state suitable for judgment. When the operating state of the engine is the predetermined operating state suitable for judgment, the routine proceeds to step 91 where the oxygen concentration sensor 27 is used to detect the oxygen concentration D. Next, at step 92, this detected oxygen concentration D is used as the basis to calculate the oxygen consumption amount DX in the exhaust purification catalyst 13. Next, at step 93, it is judged if the calculated oxygen consumption amount DX is the reference consumption amount $DX_0$ or more. When $DX < DX_0$, the routine proceeds to step 94.

At step 94, the feed amount of hydrocarbons is increased. Next, at step 95, the oxygen concentration sensor 27 is used to calculate the oxygen concentration Dd. Next, at step 95, the drop AD of the oxygen concentration in the exhaust gas which flows out from the exhaust purification catalyst 13 is calculated. Next, at step 97, this drop $\Delta D$ is used as the basis to calculate the oxidation ability M from FIG. 31C, next, at step 98, this drop $\Delta D$ is used as the basis to calculate the hydrocarbon shortage amount WD from FIG. 31C.

Figure 33A:
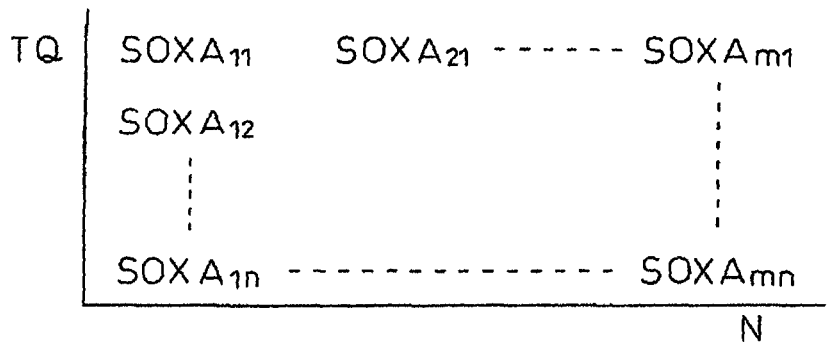
FIGS. 33A and 33B are views showing a flow chart for calculating a sulfur poisoning amount S.
Figure 33B:
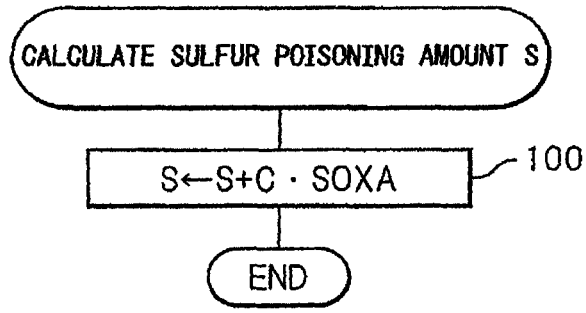

FIG. 33A and FIG. 33B show an example for finding a sulfur poisoning amount S. The amount of $SO_x$ which is contained in the exhaust gas is determined if the operating state of the engine is determined. Therefore, in this example, the $SO_x$ amount SOXA which is exhausted from the engine per unit time is stored as a function of the required torque TQ and engine speed N of the engine in the form of a map such as shown in FIG. 33A in advance inside of the ROM 32. The $SO_x$ amount which is stored in the exhaust purification catalyst 13 is considered to be proportional to the $SO_x$ amount SOXA which is exhausted from the engine. Therefore, in this example, as shown by step 100 of the calculation routine for the sulfur poisoning amount of FIG. 33B executed every unit time, the product of the $SO_x$ amount SOXA and the proportional constant C is added to S so as to calculate the sulfur poisoning amount S.

Figure 34:
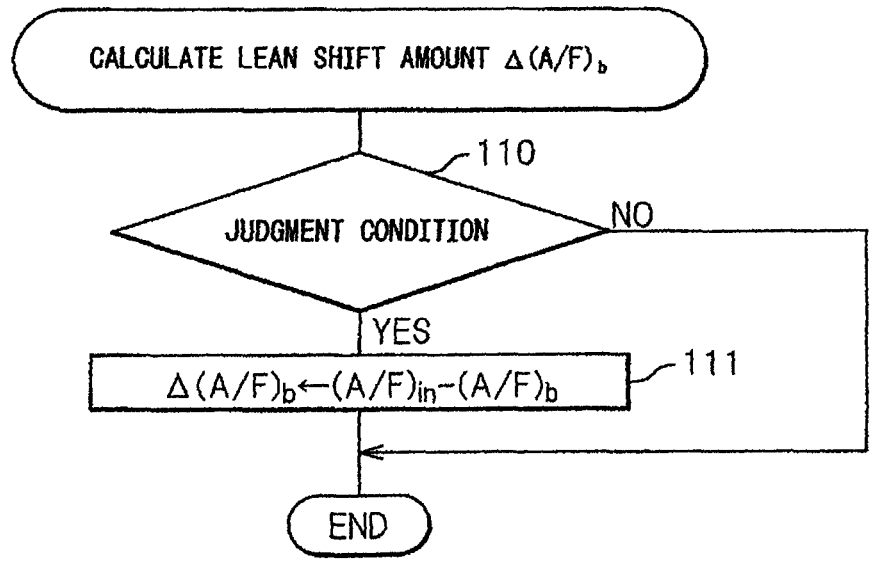

FIG. 34 shows the routine for calculating a lean shift amount $\Delta(A/F)b$ of the base air-fuel ratio (A/F)b. This routine is executed by interruption every predetermined time interval.

Referring to FIG. 34, first, at step 110, it is judged if the operating state of the engine is a predetermined operating state suitable for judgment. When the operating state of the engine is a predetermined operating state suitable for judgment, the routine proceeds to step 111 where the difference ((A/F)in-(A/F)b) between the current air-fuel ratio (A/F)in which is detected by the air-fuel ratio sensor 25 and the base air-fuel ratio (A/F)b which is calculated from the map shown in FIG. 18C is made the lean shift amount $\Delta(A/F)b$.

Figure 35A:
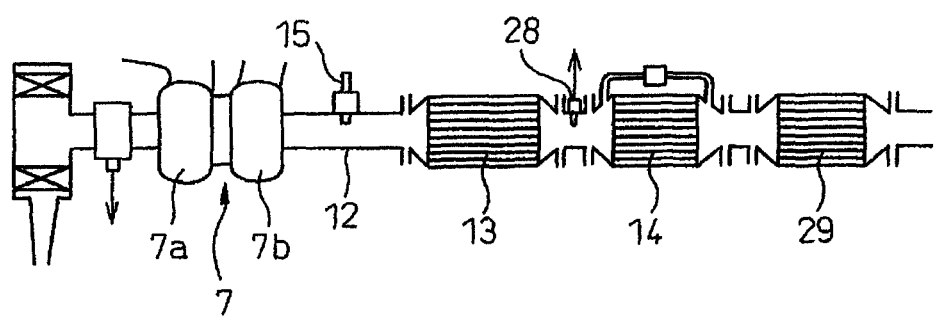
FIGS. 35A and 35B are views for explaining a method for finding an intermediate holding ability N.
Figure 35B:
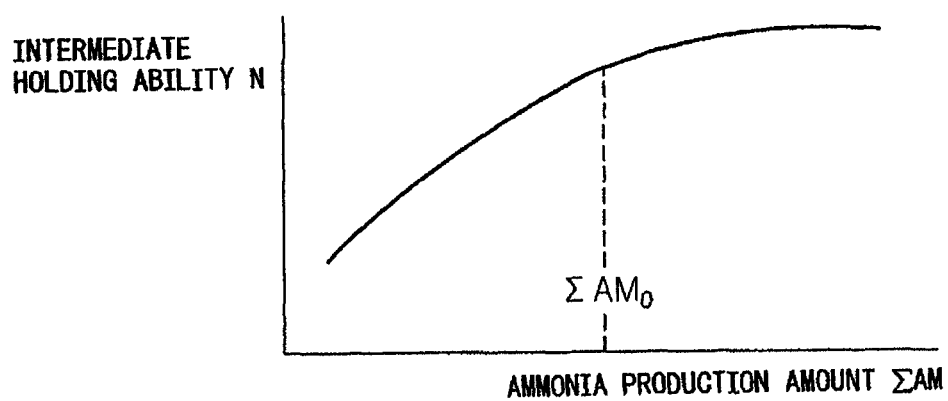

FIG. 35A and FIG. 35B show an embodiment of a judging means for judging the intermediate holding ability of the exhaust purification catalyst 13. In this embodiment, as shown in FIG. 35A, an ammonia sensor 28 is arranged downstream of the exhaust purification catalyst 13. Further, in this embodiment, it is preferable to arrange an $NO_x$ selective reduction catalyst 29 which adsorbs ammonia downstream of the particulate filter 14.

Now, it is learned that when performing the new $NO_x$ purification method according to the present invention, if making the air-fuel ratio of the combustion gas inside of the combustion chamber 2 temporarily rich, ammonia $NH_3$ flows out from the exhaust purification catalyst 13. The mechanism of production of ammonia is not necessarily clear, but probably the following mechanism is used to produce ammonia $NH_3$.

That is, if making the air-fuel ratio of the combustion gas inside of the combustion chamber 2 rich, that is, if burning the fuel in the combustion chamber 2 under insufficient oxygen, a large amount of carbon monoxide CO is produced. This carbon monoxide CO causes an aqueous gas producing reaction with the moisture contained in the exhaust gas on the precious metal catalyst 51 of the exhaust purification catalyst 13 ($CO+H_2O \rightarrow H_2+CO_2$). As a result, hydrogen $H_2$ is produced. This hydrogen $H_2$ reacts with the amine compound $R-NH_2$ which is held on the basic layer 53 of the exhaust purification catalyst 13, consequently ammonia $NH_3$ is produced. Further, due to this hydrogen $H_2$, the hydrolysis action of the isocyanate compound $R-NCO$ which is held on the basic layer 53 is promoted, consequently ammonia $NH_3$ is produced.

Therefore, when the air-fuel ratio of the combustion gas inside of the combustion chamber 2 is made rich, the larger the amount of reducing intermediate $R-NCO$ or $R-NH_2$ held at the basic layer 53, the larger the ammonia amount.

Therefore, it becomes possible to estimate the intermediate holding ability N from the ammonia amount generated at this time. Therefore, in an embodiment of the present invention, when the air-fuel ratio of the combustion gas inside of the combustion chamber 2 is made rich, it is judged that the holding ability of the reducing intermediate N falls when the ammonia amount $\Sigma AM$ which flows out from the exhaust purification catalyst 13 is smaller than the predetermined reference amount $\Sigma AM_0$ shown in FIG. 35B.

Figure 36:
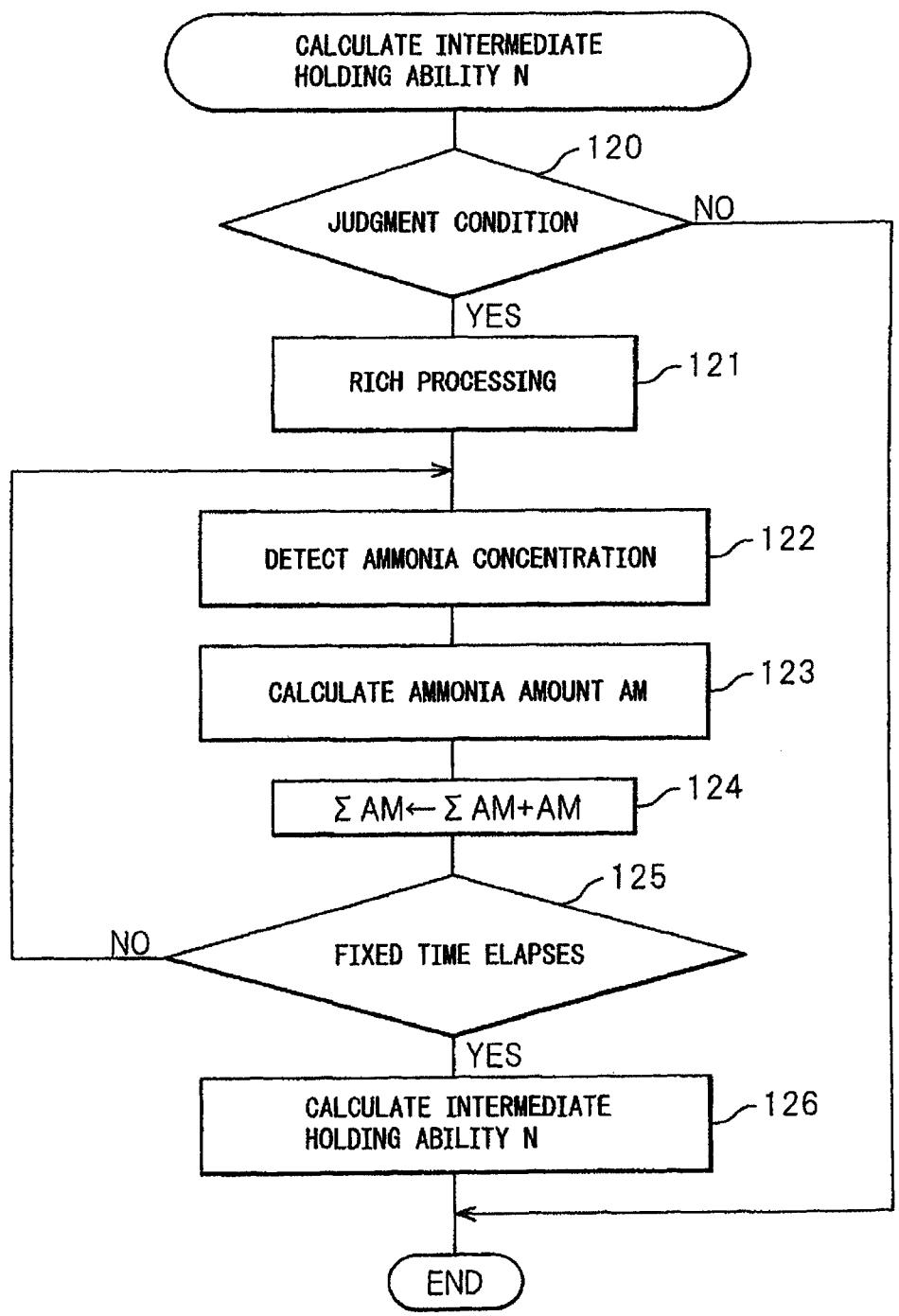
FIG. 36 is a flow chart for calculating an intermediate holding ability.

FIG. 36 is a view showing a routine for working the method of judgment explained based on FIG. 35A and FIG. 35B.

Referring to FIG. 36, first, at step 120, it is judged if the operating state of the engine is a predetermined operating state suitable for judgment. When the operating state of the engine is a predetermined operating state suitable for judgment, the routine proceeds to step 121 where the air-fuel ratio of the combustion gas inside of the combustion chamber 2 is made rich.

Next, at step 122, the ammonia sensor 28 is used to detect the ammonia concentration. Next, at step 123, the ammonia amount AM is calculated from the exhaust gas amount, that is, the intake air amount, and the ammonia concentration. Next, at step 124, the ammonia amount AM is added to the cumulative value of the ammonia amount $\Sigma AM$. Next, at step 125, it is judged if the predetermined time has elapsed. When the predetermined time has not elapsed, the routine returns to step 122. As opposed to this, when a predetermined time has elapsed, the routine proceeds to step 126 where the cumulative value of the ammonia amount, that is, the ammonia generation amount $\Sigma AM$, is used as the basis to calculate the intermediate holding ability N from FIG. 35B.

Note that, as another embodiment, in the engine exhaust passage upstream of the exhaust purification catalyst 13, an oxidation catalyst for modifying the hydrocarbons can be arranged.

REFERENCE SIGNS LIST

4 . . . intake manifold
5 . . . exhaust manifold
7 . . . exhaust turbocharger
12 . . . exhaust pipe
13 . . . exhaust purification catalyst
14 . . . particulate filter
15 . . . hydrocarbon feed valve

The invention claimed is:

1. A method for purifying exhaust gas of an internal combustion engine, the method comprising:
   a first method that comprises:
      chemically reducing NOx that is contained in the exhaust gas when a concentration of hydrocarbons flowing into an exhaust purification catalyst is made to vibrate within a predetermined range of amplitude and within a predetermined range of period, wherein during the chemical reduction, the NOx contained in the exhaust gas is reacted with reformed hydrocarbons to produce a reducing intermediate containing nitrogen and hydrocarbons, a reducing action of the reducing intermediate chemically reduces the NOx, and the NOx is chemically reduced without storing nitrates or with storing a fine amount of the nitrates in a basic layer of the exhaust purification catalyst; and
   further comprises a second method that comprises:
      lengthening the vibration period of the hydrocarbon concentration more than the predetermined range, wherein the lengthening causes an increase in a storage amount of the NOx that is contained in the exhaust gas in the basic layer of the exhaust purification catalyst.

2. The method according to claim 1, wherein
the predetermined vibration period of the hydrocarbon concentration is the vibration period required for continuing to produce the reducing intermediate.

3. The method according to claim 2, wherein the predetermined vibration period of the hydrocarbon concentration is between 0.3 second to 5 seconds.

4. The method according to claim 3, wherein the predetermined range of the amplitude of the hydrocarbon concentration is 200 ppm to 1000 ppm.

5. The method according to claim 1, wherein the exhaust purification catalyst comprises a precious metal catalyst and the basic layer, wherein
the precious metal catalyst catalyzes the reaction of the NOx contained in the exhaust gas and the reformed hydrocarbons to produce the reducing intermediate containing nitrogen and hydrocarbons,
the produced reducing intermediate is held on the basic layer, and
a reducing action of the reducing intermediate that is held on the basic layer chemically reduces the NOx.

6. The method according to claim 1, wherein at least one of the amplitude of the hydrocarbon concentration and the vibration period of the hydrocarbon concentration is changed in accordance with the concentration of hydrocarbons or a state of the exhaust purification catalyst.

7. The method according to claim 6, wherein the amplitude of the hydrocarbon concentration is made larger when an air-fuel ratio of a combustion gas for generating an engine output is higher than a base air-fuel ratio.

8. The method according to claim 6, wherein, the hydrocarbons are intermittently fed from a hydrocarbon feed valve into an engine exhaust passage, the hydrocarbons are fed into a combustion chamber in a latter half of an expansion stroke, or are fed during an exhaust stroke, wherein the feeding of the hydrocarbons causes the concentration of the hydrocarbons to vibrate within the predetermined range of amplitude and within the predetermined range of period, wherein at least one of a feed amount of hydrocarbons per feed or a feed period of hydrocarbons is changed in accordance with the concentration of hydrocarbons, or the state of the exhaust purification catalyst.

9. The method according to claim 8, wherein if an oxidation ability of the exhaust purification catalyst falls, the feed amount of hydrocarbons per feed is reduced.

10. The method according to claim 9, wherein if the oxidation ability of the exhaust purification catalyst falls, the feed period of hydrocarbons is shortened.

11. The method according to claim 10, wherein if the oxidation ability of the exhaust purification catalyst falls, a base air-fuel ratio having an air-fuel ratio of a combustion gas for generating an engine output is made smaller.

12. The method according to claim 9, wherein an electronic control unit determines that the oxidation ability of the exhaust purification catalyst has fallen when a temperature of the exhaust purification catalyst is lower than an activation temperature.

13. The method according to claim 9, wherein a catalyst having an oxidation function or a particulate filter is arranged in the engine exhaust passage downstream of the exhaust purification catalyst, and an electronic control unit determines that the oxidation ability of the exhaust purification catalyst has fallen when an exhaust gas temperature rises in the time from when the exhaust gas flows into the catalyst having an oxidation function or the particulate filter to when it flows out of the catalyst having an oxidation function or the particulate filter is larger than a predetermined reference rise.

14. The method according to claim 9, wherein when an electronic control unit determines that the oxidation ability of the exhaust purification catalyst falls when a drop in the oxygen concentration in the exhaust gas flowing out from the exhaust purification catalyst is smaller than a predetermined reference drop, the feed amount of hydrocarbons is increased.

15. The method according to claim 8, wherein the feed amount of hydrocarbons per feed is increased when there are not enough of the hydrocarbons required for the reduction of the NOx in the exhaust purification catalyst.

16. The method according to claim 15, wherein an electronic control unit determines that there is not enough of an amount of hydrocarbons as required for reduction of NOx in the exhaust purification catalyst when an amount of sulfur poisoning at an upstream side end of the exhaust purification catalyst becomes larger than a predetermined reference poisoning amount.

17. The method according to claim 15, wherein a catalyst having an oxidation function or a particulate filter is arranged in the engine exhaust passage downstream of the exhaust purification catalyst, and wherein an electronic control unit determines that there is not enough of the hydrocarbons required for the reduction of NOx in the exhaust purification catalyst when a rise of an exhaust gas temperature flowing into the catalyst having an oxidation function or the particulate filter to when it flows out of the catalyst having an oxidation function or particulate filter is smaller than a predetermined reference rise.

18. The method according to claim 15, wherein an electronic control unit determines that there is not enough of the hydrocarbons required for the reduction of NOx in the exhaust purification catalyst when a drop in the oxygen concentration in the exhaust gas flowing out from the exhaust purification catalyst is larger than a predetermined reference drop, the feed amount of hydrocarbons is increased.

19. The method according to claim 15, wherein an electronic control unit determines that there is not enough of the hydrocarbons required for the reduction of NOx in the exhaust purification catalyst when a base air-fuel ratio having an air-fuel ratio of a combustion gas for generating an engine output shifts to a lean side by a predetermined amount or more.

20. The method according to claim 15, wherein the feed period of the hydrocarbons is made longer when the feed amount of hydrocarbons becomes a predetermined reference amount or more.

21. The method according to claim 8, wherein the exhaust purification catalyst comprises a precious metal catalyst and the basic layer, wherein the precious metal catalyst catalyzes the reaction of the NOx contained in the exhaust gas and the reformed hydrocarbons to produce the reducing intermediate containing nitrogen and hydrocarbons, the produced reducing intermediate is held on the basic layer, and the feed period of the hydrocarbons is made shorter when a holding ability of the basic layer falls.

22. The method according to claim 21, wherein an electronic control unit determines that the holding ability of the basic layer falls if an amount of ammonia flowing out from the exhaust purification catalyst is smaller than a predetermined reference amount when an air-fuel ratio of a combustion gas in the combustion chamber is made rich.

23. The method according to claim 1, wherein the exhaust purification catalyst comprises a precious metal catalyst comprised of platinum Pt and at least one of rhodium Rh and palladium Pd.

24. The method according to claim 1, wherein the basic layer contains an alkali metal, an alkali earth metal, a rare earth, or a metal which can donate electrons to NOx and wherein a surface of the basic layer forms a basic exhaust gas flow surface part.

25. The method according to claim 1, wherein an electronic control unit is configured to control the vibration of the concentration of hydrocarbons flowing into the exhaust purification catalyst within the predetermined range of amplitude and within the predetermined range of period.

* * * * *